United States Patent
Wang et al.

(10) Patent No.: US 11,412,437 B2
(45) Date of Patent: Aug. 9, 2022

(54) DATA TRANSMISSION METHOD AND ELECTRONIC DEVICE

(71) Applicant: HUAWEI TECHNOLOGIES CO., LTD., Guangdong (CN)

(72) Inventors: Hao Wang, Shanghai (CN); Fanzhao Wang, Shenzhen (CN); Jianfeng Qi, Shenzhen (CN); Shuo Chen, Beijing (CN); Xingmin Guo, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/262,638

(22) PCT Filed: Oct. 12, 2018

(86) PCT No.: PCT/CN2018/110134
§ 371 (c)(1),
(2) Date: Jan. 22, 2021

(87) PCT Pub. No.: WO2020/019533
PCT Pub. Date: Jan. 30, 2020

(65) Prior Publication Data
US 2021/0274420 A1 Sep. 2, 2021

(30) Foreign Application Priority Data
Jul. 23, 2018 (CN) .......................... 201810814504.5

(51) Int. Cl.
*H04W 40/12* (2009.01)
*H04L 45/24* (2022.01)
(Continued)

(52) U.S. Cl.
CPC ............ *H04W 40/12* (2013.01); *H04L 45/24* (2013.01); *H04L 69/14* (2013.01); *H04L 69/163* (2013.01)

(58) Field of Classification Search
None
See application file for complete search history.

(56) References Cited

U.S. PATENT DOCUMENTS

| 9,883,000 B2 * | 1/2018 | Yi .......................... H04W 4/12 |
| 2015/0039684 A1 | 2/2015 | Salkintzis et al. |

(Continued)

FOREIGN PATENT DOCUMENTS

| CN | 102761470 A | 10/2012 |
| CN | 103313232 A | 9/2013 |

(Continued)

*Primary Examiner* — Anh Vu H Ly
(74) *Attorney, Agent, or Firm* — Womble Bond Dickinson (US) LLP

(57) ABSTRACT

This application provides a data transmission method and an electronic device. The method includes: establishing, by an electronic device, a multipath transmission control protocol MPTCP connection to a first application server, where the MPTCP connection includes a first TCP connection and a second TCP connection, and a data transmission delay of the first TCP connection is less than a data transmission delay of the second TCP connection; and receiving, by the electronic device, indication information from the first application server, where the indication information includes a type identifier used to indicate a type of a data stream sent by the first application server; receiving, by the electronic device preferentially by using the first TCP connection or the second TCP connection, the data stream from the first application server according to the indication information.

14 Claims, 13 Drawing Sheets

(51) Int. Cl.
*H04L 69/14* (2022.01)
*H04L 69/163* (2022.01)

(56) References Cited

U.S. PATENT DOCUMENTS

| | | | |
|---|---|---|---|
| 2015/0334002 A1 | 11/2015 | Jogalekar et al. | |
| 2015/0341830 A1* | 11/2015 | Jeong | H04W 24/02 370/329 |
| 2016/0212759 A1 | 7/2016 | Schliwa-Bertling et al. | |
| 2017/0063699 A1* | 3/2017 | Kim | H04L 47/2491 |
| 2017/0346762 A1* | 11/2017 | Lapidous | H04L 47/27 |
| 2018/0067436 A1 | 3/2018 | Ueno | |
| 2018/0212883 A1* | 7/2018 | Wei | H04L 67/02 |
| 2018/0220283 A1* | 8/2018 | Condeixa | H04L 67/12 |
| 2019/0386911 A1* | 12/2019 | Zhu | H04L 45/54 |

FOREIGN PATENT DOCUMENTS

| | | | | |
|---|---|---|---|---|
| CN | 103875304 A | 6/2014 | | |
| CN | 105474598 A | 4/2016 | | |
| CN | 105490933 A | 4/2016 | | |
| CN | 105722164 A | 6/2016 | | |
| CN | 106664650 A | 5/2017 | | |
| CN | 108293221 A | 7/2018 | | |
| JP | 2017028589 A | 2/2017 | | |
| JP | 2017143336 A | 8/2017 | | |
| WO | 2016099371 A1 | 6/2016 | | |
| WO | 2017194406 A1 | 11/2017 | | |
| WO | WO-2018112657 A1 * | 6/2018 | | H04L 12/66 |
| WO | WO-2019014426 A1 * | 1/2019 | | H04L 45/24 |

* cited by examiner

DATA TRANSMISSION METHOD AND ELECTRONIC DEVICE

CROSS-REFERENCE TO RELATED APPLICATIONS

This application is a national stage of International Application No. PCT/CN2018/110134, filed on Oct. 12, 2018, which claims priority to Chinese Patent Application No. 201810814504.5, filed with the China National Intellectual Property Administration on Jul. 23, 2018. Both of the aforementioned applications are hereby incorporated by reference in their entireties.

TECHNICAL FIELD

This application relates to the field of terminal technologies, and in particular, to a data transmission method and an electronic device.

BACKGROUND

The multipath transmission control protocol (MPTCP) is an extension of the TCP, and uses parallel transmission of a plurality of TCP connections to improve resource utilization and enhance a capability of recovering from a connection failure. For example, China Telecom carries out a promotion: A subscriber gets an optical fiber home broadband and 4G wireless traffic package of China Telecom by paying CNY199 per month. A current situation is that Xiaoming uses either wireless fidelity (Wi-Fi) or long term evolution (LTE) after purchasing the package. In this case, it is assumed that it takes Xiaoming one hour in total to download a movie by using Wi-Fi or LTE. Therefore, when Xiaoming uses the MPTCP (that is, uses two TCP connections: Wi-Fi and LTE) to download the movie, the download can be completed within 30 minutes, saving half of the time (assuming that a download speed of Wi-Fi is similar to that of LTE). In other words, when the movie is downloaded by using the MPTCP, the movie download time is halved. However, due to different air interface transmission technologies of heterogeneous networks (for example, Wi-Fi and LTE), there are significant differences in bandwidth, a delay, a packet loss rate, and other aspects. After passing through differentiated TCP connections, data packets of a same data stream arrive at a peer end in disorder. However, the TCP provides reliable and ordered data submission. This frequently causes a phenomenon that a "data packet that arrives earlier" waits for a "data packet that arrives later" during transmission on the heterogeneous networks. Apparently, a more serious difference causes more significant out-of-order, and may even cause a case in which bandwidth obtained by aggregating a plurality of TCP connections is lower than "maximum single-path bandwidth". This phenomenon is usually referred to as a negative gain phenomenon of multipath transmission.

In a prior-art solution, the negative gain phenomenon is addressed by using an opportunistic retransmission and penalty mechanism. In short, if it is found that a data packet does not arrive at a peer end in a timely manner, the data packet is retransmitted in a timely manner through a TCP connection with a comparatively short round-trip time. If data packets that pass through a TCP connection are frequently subject to the foregoing delay arrival, a transmit end punitively reduces a size of a send window of the TCP connection, and reduces a quantity of packets that can be sent, to alleviate an out-of-order phenomenon. Currently, a widely used data scheduling algorithm is a minimum round-trip time (min round-trip time) scheduling algorithm. To be specific, a receive end preferentially uses a TCP connection with a minimum round-trip time to receive data, and when a receive window of the TCP connection with the minimum round-trip time is congested, also uses a TCP connection with a second shortest round-trip time to receive the data. However, a current situation is that, in most public places such as airports, shopping malls, schools, and companies, both an average value and a jitter of a round-trip time on a Wi-Fi network are far greater than those on a cellular network. As a result, if a movie is downloaded in an actual test, more than 70% of a data volume corresponding to the power supply may occupy the cellular network, and a data volume that occupies the Wi-Fi network may be less than 30%. Consequently, costs are comparatively high, and user acceptance is affected.

SUMMARY

This application provides a data transmission method and an electronic device, to resolve a prior-art problem that data transmission occupies comparatively large data traffic of a cellular network and occupies comparatively small data traffic of a Wi-Fi network, causing comparatively high costs.

According to a first aspect, an embodiment of this application provides a data transmission method, and the method includes: establishing, by an electronic device, an MPTCP connection to a first application server, where the MPTCP connection includes a first TCP connection and a second TCP connection, and a data transmission delay of the first TCP connection is less than that of the second TCP connection; receiving, by the electronic device, indication information from the first application server, where the indication information includes a type identifier used to indicate a type of a data stream of a first service that is sent by the first application server; and when the type identifier is a first identifier, receiving, by the electronic device preferentially by using the first TCP connection, the data stream from the first application server in a first time period after the electronic device receives the indication information; or when the type identifier is a second identifier, receiving, by the electronic device preferentially by using the second TCP connection, the data stream from the first application server in a second time period after the electronic device receives the indication information.

In this embodiment of this application, a delay required by a data stream indicated by the first identifier is less than that required by a data stream of a second service that is indicated by the second identifier, and a delay of a TCP connection corresponding to a cellular network is less than that of a TCP connection corresponding to a Wi-Fi network. Therefore, when the first TCP connection corresponds to the cellular network and the second TCP connection corresponds to the Wi-Fi network, according to the method, when the indication information includes the second identifier and the electronic device 100 receives the data stream subsequently sent by the first application server, data traffic of the Wi-Fi network can be occupied as much as possible, and less data traffic of the cellular network is occupied, to reduce consumption of data traffic of the cellular network; or when the indication information includes the first identifier and the electronic device 100 receives the data stream subsequently sent by the first application server, data traffic of an LTE network can be occupied as much as possible, so that a play start delay can be reduced.

In an embodiment, the indication information may further include a parameter used to indicate a bandwidth requirement, and the method further includes: obtaining, by the electronic device, the parameter from the indication information; and when the electronic device determines that bandwidth corresponding to a case in which a receive window of the second TCP connection is maximized is lower than the bandwidth requirement indicated by the parameter, receiving, by the electronic device in the second time period, the data stream also by using the first TCP connection, where the electronic device adjusts a receive window of the first TCP connection in the second time period, so that aggregated bandwidth of the second TCP connection and the first TCP connection is higher than or equal to the bandwidth requirement indicated by the parameter. In this way, the data stream can be received at a comparatively high rate, and a play start delay can be reduced.

According to a second aspect, an embodiment of this application provides a data transmission method, and the method includes: establishing, by an electronic device, an MPTCP connection to a first application server, where the MPTCP connection includes a first TCP connection and a second TCP connection, and a data transmission delay of the first TCP connection is less than that of the second TCP connection; receiving, by the electronic device, a data stream from the first application server; and when the electronic device determines that traffic of the received data stream in a unit time is greater than a first threshold, obtaining, by the electronic device, a creation time of each data stream from the first application server, and receiving, by the electronic device based on the creation time of the data stream by using both the first TCP connection and the second TCP connection in parallel, N data streams whose creation time is later than a specified threshold, where N is a positive integer greater than or equal to 1; or when the electronic device determines that traffic of the received data stream in a unit time is less than a second threshold, receiving, by the electronic device, the data stream preferentially by using the second TCP connection, where the first threshold is far greater than the second threshold.

In this embodiment of this application, the electronic device adjusts a data stream receiving policy based on a traffic change rate of the received data stream. When the traffic of the data stream in the unit time is greater than the first threshold, a data stream created earlier is received simultaneously by using a plurality of links, so that a play start delay can be reduced; or when the traffic of the data stream in the unit time is less than the first threshold, the data stream is received preferentially by using the second TCP connection. A delay of a TCP connection corresponding to a cellular network is less than that of a TCP connection corresponding to a Wi-Fi network. Therefore, when the second TCP connection is a TCP connection corresponding to the Wi-Fi network, according to the method, data traffic of the Wi-Fi network can be occupied as much as possible, and less data traffic of the cellular network is occupied, to reduce consumption of data traffic of the cellular network.

According to a third aspect, an embodiment of this application provides an electronic device, including a processor, a memory, a display, and a camera. The memory is configured to store one or more computer programs. When the one or more computer programs stored in the memory are executed by the processor, the electronic device is enabled to implement the method in any possible design of the first aspect.

According to a fourth aspect, an embodiment of this application further provides an electronic device. The electronic device includes modules/units that perform the method in any one of the first aspect or the possible designs of the first aspect. These modules/units may be implemented by hardware, or may be implemented by hardware by executing corresponding software.

According to a fifth aspect, an embodiment of this application further provides a computer readable storage medium. The computer readable storage medium includes a computer program. When the computer program runs on an electronic device, the electronic device is enabled to perform the method in any possible design.

According to a sixth aspect, an embodiment of this application further provides a computer program product. When the computer program product runs on an electronic device, the electronic device is enabled to perform the method in any possible design.

These aspects or other aspects of this application are clearer and easier to understand in descriptions of the following embodiments.

DESCRIPTION OF EMBODIMENTS

For ease of understanding, some concepts related to the embodiments of this application are described as examples for reference.

Streaming media is a media format for playing on a network in a manner of streaming transmission. The streaming media, also referred to as streaming-type media, is media that enables playing during transmission, and is a type of multimedia. The playing during transmission means that when a media provider transmits media on a network, a user continuously receives and watches or listens to the transmitted media "at the same time".

The following describes the technical solutions in the embodiments of this application with reference to the accompanying drawings in the embodiments of this application. In the following descriptions of the embodiments of this application, terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more features. In the description of the embodiments of this application, unless otherwise stated, "plurality" means two or more than two.

Figure 1:
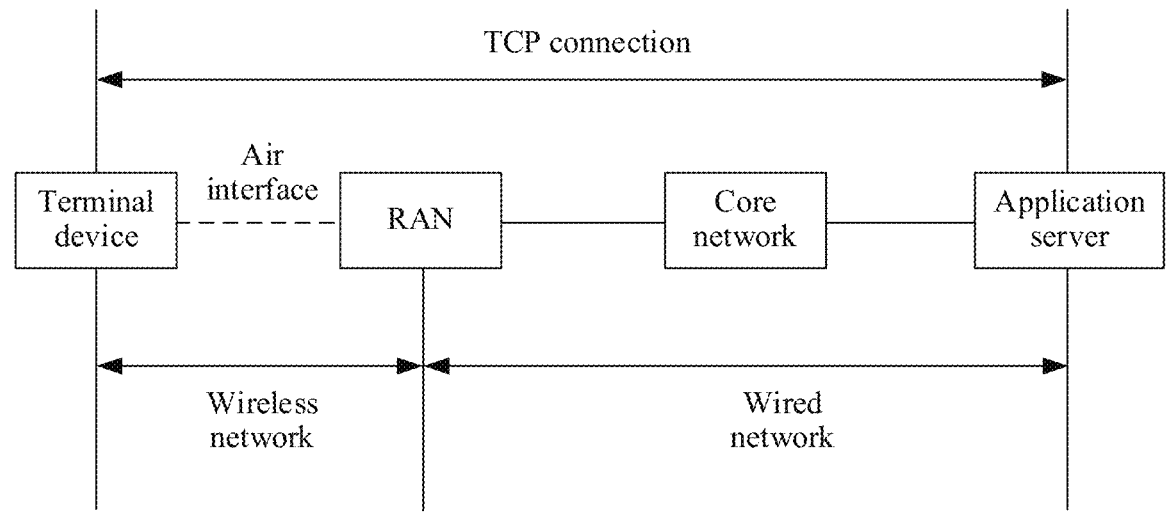
FIG. 1 shows a system architecture to which a multipath data transmission method is applied according to an embodiment of this application.

A data transmission method provided in the embodiments of this application may be applied to data transmission in a wireless communications system. A data receive end exchanges data with a data transmit end by using a radio access network (RAN) and a core network. A transmission control protocol (TCP) connection may be further established between the data receive end and the data transmit end, and data is transmitted by using the TCP protocol. As shown in FIG. 1, in a wireless communications system, a terminal device exchanges data with an application server. The terminal device accesses a RAN by using an air interface, and is connected to the application server by using a core network. A network between the terminal and the RAN may be referred to as a wireless network, and a network between the RAN and the application server may be referred to as a wired network. A TCP connection is established between the application server and the terminal, and data is transmitted between the application server and the terminal.

With development of communications technologies, a communications system has evolved into a communications architecture in which a plurality of communications networks are jointly deployed, and a terminal may access a plurality of communications networks for communication. It should be noted that when the communications network is a local area network, for example, the communications network may be a short-distance communications network such as a wireless fidelity (Wi-Fi) network, a Bluetooth network, a ZigBee network, or a near field communication (NFC) network. When the communications network is a wide area network, for example, the communications network may be a 3rd-generation mobile communications technology (3G) network, a 4th-generation mobile communications technology (4G) network, a 5th-generation mobile communications technology (5G) network, a future evolved public land mobile network (PLMN), or the Internet.

Figure 2:
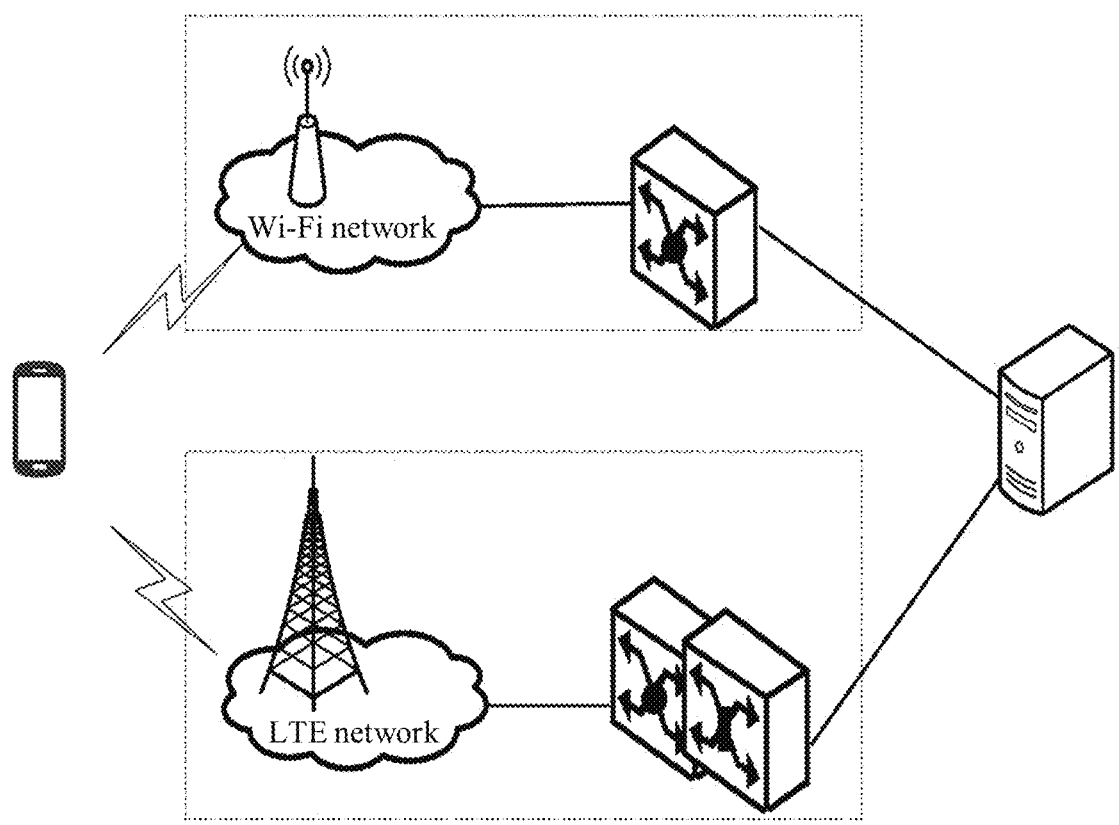
FIG. 2 is an architectural diagram of a data transmission system in which a plurality of networks are deployed according to an embodiment of this application.

For example, as shown in FIG. 2, in a communications system in which a Wi-Fi network and a long term evolution (LTE) network are deployed, a terminal may access the Wi-Fi network, and transmit data with an application server by using an evolved packet data gateway (ePDG) or a trusted gateway (TGW); or may access the LTE network, and transmit data with the application server by using a serving gateway (SGW) or a packet data gateway (PGW).

Figure 3:
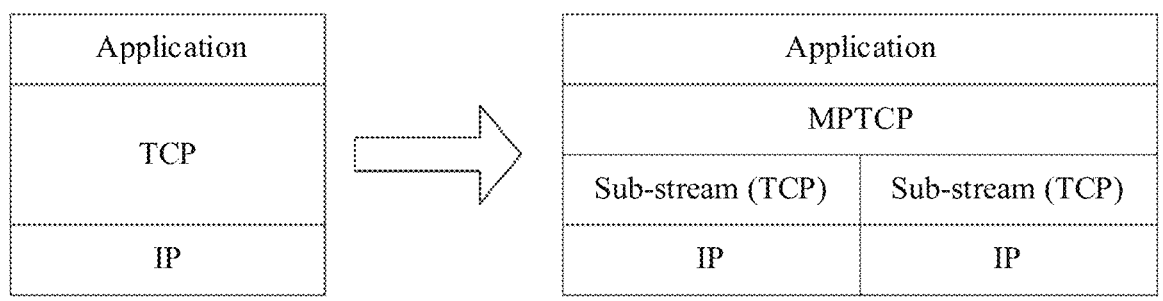
FIG. 3 is a schematic diagram of extending a TCP protocol stack to an MPTCP protocol stack according to an embodiment of this application.

Deployment of heterogeneous networks promotes development of a multipath data transmission service. Currently, the MPTCP protocol is obtained by extending the TCP protocol, and the MPTCP protocol enables data transmission for one service by using multipath network resources. For example, data is transmitted by using a Wi-Fi network resource and an LTE network resource in FIG. 2. FIG. 3 is a schematic diagram of extending a TCP protocol stack to an MPTCP protocol stack. In the TCP protocol stack, a TCP stream at an application layer is sent by using one TCP stream. In the MPTCP protocol stack, a transport layer is divided into two sub-layers: an MPTCP layer and a TCP layer, and a TCP stream at an application layer is decomposed into two TCP sub-streams at the MPTCP layer for separate transmission.

Figure 4:
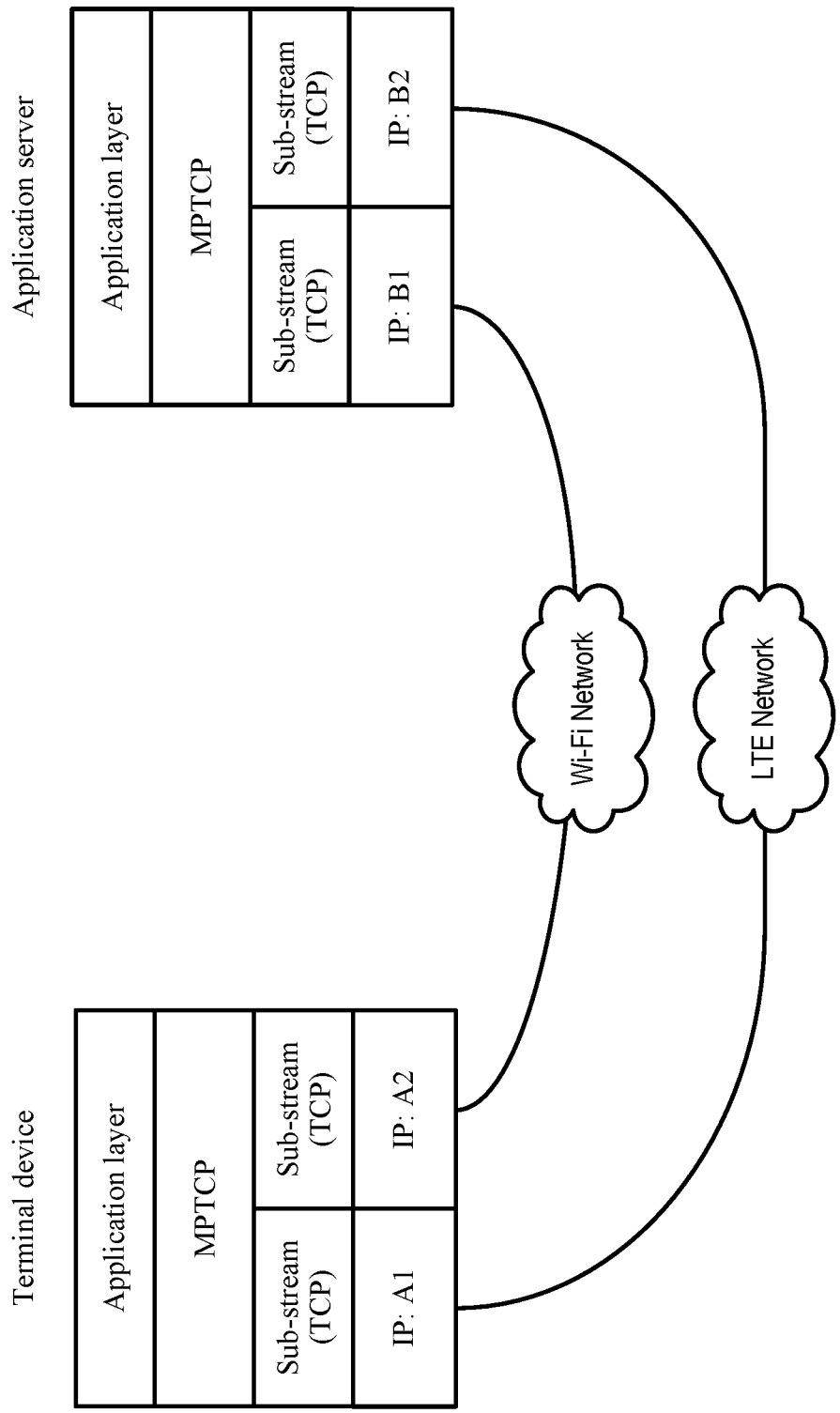
FIG. 4 is a schematic diagram of an MPTCP implementation process according to an embodiment of this application.

FIG. 4 is a schematic diagram of an MPTCP use scenario. In FIG. 4, two TCP connections are established between a terminal device and an application server. One TCP connection uses a Wi-Fi network resource, and the other TCP connection uses an LTE network resource. An MPTCP layer of the application server decomposes a TCP stream into two TCP sub-streams, and the two TCP sub-streams are separately transmitted to the terminal device by using the two TCP connections. After receiving the two TCP sub-streams, the terminal device combines the two sub-streams, and then sends a combined stream to an application layer.

In some embodiments of this application, the terminal device in the wireless communications system shown in FIG. 1 may be a portable electronic device that further includes another function such as a personal digital assistant function and/or a music player function, for example, a mobile phone, a tablet computer, or a wearable device (such as a smartwatch) with a wireless communication function. An example embodiment of a portable electronic device includes but is not limited to a portable electronic device using iOS®, Android®, Microsoft®, or another operating system. The portable electronic device may be alternatively another portable electronic device, for example, a laptop computer with a touch-sensitive surface (for example, a touch panel). It should be further understood that in some other embodiments of this application, the terminal may alternatively not be a portable electronic device, but may be a desktop computer with a touch-sensitive surface (for example, a touch panel).

Figure 5:
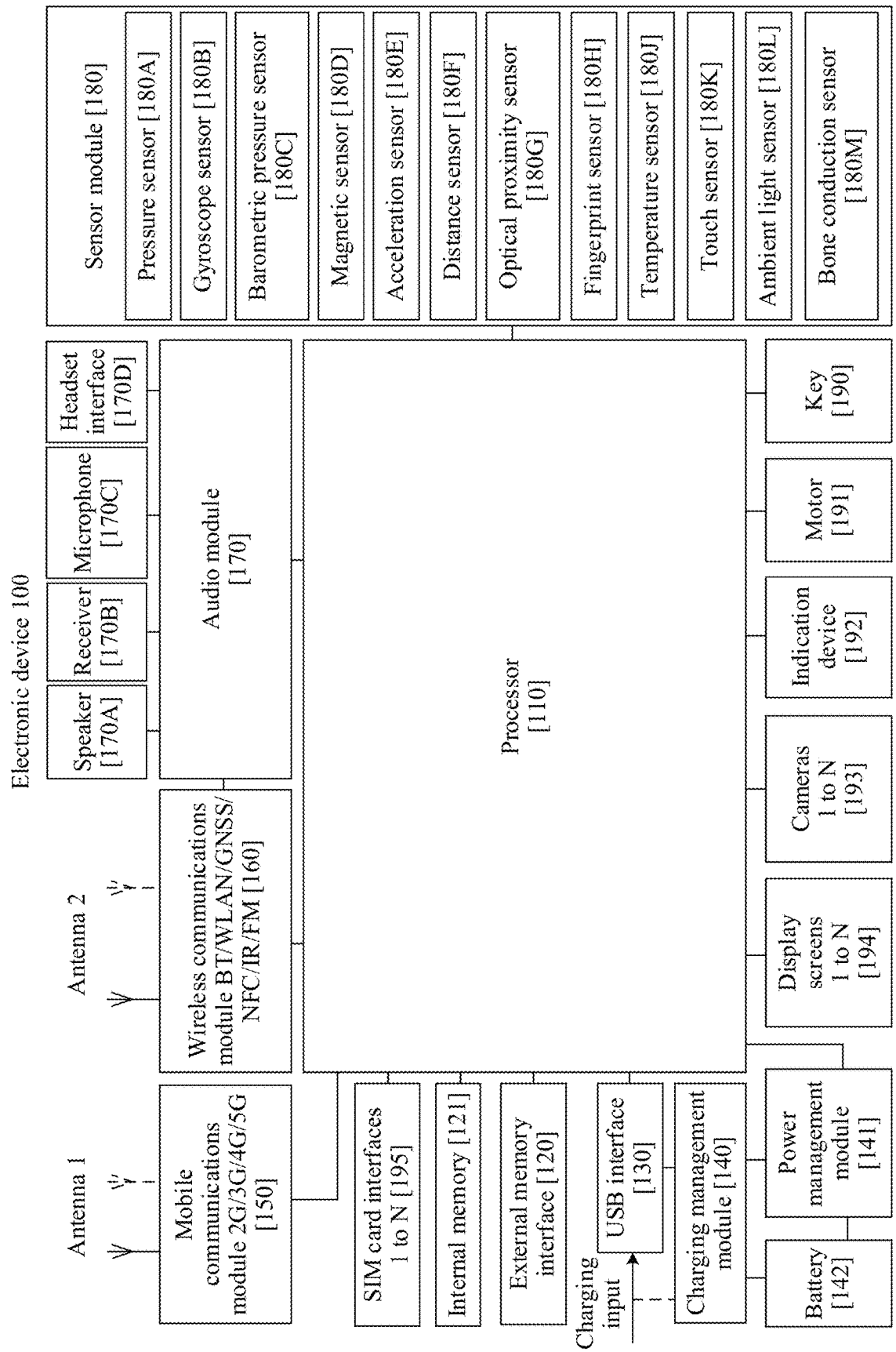
FIG. 5 is a schematic structural diagram of an electronic device according to an embodiment of this application.

For example, as shown in FIG. 5, a terminal device in an embodiment of this application may be an electronic device 100. The following describes this embodiment by using the electronic device 100 as an example.

The electronic device 100 may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, a sensor module 180, a key 190, a motor 191, an indication device 192, a camera 193, a display screen 194, a SIM card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate devices, or may be integrated into one or more processors.

The controller may be a nerve center and a command center of the electronic device 100. The controller may generate an operation control signal based on an instruction operation code and a time sequence signal, to control obtaining of an instruction and execution of the instruction.

A memory may be further disposed in the processor 110 to store an instruction and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter ( ) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, including a serial data line (SDA) and a serial clock line (SCL). In some embodiments, the processor 110 may include a plurality of I2C buses. The processor 110 may be coupled to the touch sensor 180K, a charger, a flash, the camera 193, and the like separately by using different I2C bus interfaces. For example, the processor 110 may be coupled to the touch sensor 180K by using an I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of I2S buses. The processor 110 may be coupled to the audio module 170 by using an I2S bus, to implement communication between the processor 110 and the audio module 170. In some embodiments, the audio module 170 may transmit an audio signal to the wireless communications module 160 by using the I2S interface, to implement a function of answering a call by using a Bluetooth headset.

The PCM interface may also be used for audio communication, to sample, quantize, and encode an analog signal. In some embodiments, the audio module 170 may be coupled to the wireless communications module 160 by using the PCM bus interface. In some embodiments, the audio module 170 may also transmit an audio signal to the wireless communications module 160 by using the PCM interface, to implement a function of answering a call by using a Bluetooth headset. Both the I2S interface and the PCM interface may be used for audio communication.

The UART interface is a universal serial data bus used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 by using the UART interface, to implement a function of playing music by using a Bluetooth headset.

The MIPI interface may be configured to connect the processor 110 to a peripheral device such as the display screen 194 or the camera 193. The MIPI interface includes a camera serial interface (CSI), a display serial interface (DSI), and the like. In some embodiments, the processor 110 communicates with the camera 193 by using the CSI interface, to implement a photographing function of the electronic device 100; and the processor 110 communicates with the display screen 194 by using the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display screen 194, the wireless communications module 160, the audio module 170, the sensor module 180, or the like. The GPIO interface may be alternatively configured as an I2C interface, an I2S interface, a UART interface, an MIPI interface, or the like.

The USB interface 130 is an interface that complies with a USB standard specification, and may be a mini USB interface, a micro USB interface, a USB Type C interface, or the like. The USB interface may be configured to connect to a charger to charge the electronic device 100, or may be configured to transmit data between the electronic device 100 and a peripheral device, or may be configured to connect to a headset to play an audio file by using the headset. Alternatively, the interface may be configured to connect to another electronic device, for example, an AR device.

It can be understood that an interface connection relationship between the modules shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The charger may be a wireless charger, or may be a wired charger. In some embodiments of wired charging, the charging management module 140 may receive charging input from a wired charger by using the USB interface. In some embodiments of wireless charging, the charging management module 140 may receive wireless charging input by using a wireless charging coil of the electronic device 100. When the charging management module 140 charges the battery 142, the power management module 141 may further supply power to the electronic device.

The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a quantity of battery cycles, and a battery health status (electric leakage and impedance). In some other embodiments, the power management module 141 may be alternatively disposed in the processor 110. In some other embodiments, the power management module 141 and the charging management module 140 may be alternatively disposed in a same device.

A wireless communication function of the electronic device 100 may be implemented by the antenna module 1, the antenna module 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be multiplexed to improve antenna utilization. For example, an antenna of a cellular network may be multiplexed as a diversity antenna of a wireless local area network. In some other embodiments, an antenna may be used in combination with a tuning switch.

The mobile communications module 150 may provide a solution that is applied to the electronic device 100 and that includes wireless communications technologies such as 2G, 3G, 4G, and 5G. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave and radiate the electromagnetic wave by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into an intermediate- or high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor and a processed signal is transmitted to the application processor. The application processor outputs a sound signal by using an audio device (not limited to the speaker 170A, the receiver 170B, and the like), or displays an image or a video by using the display screen 194. In some embodiments, the modem processor may be an independent device. In some other embodiments, the modem processor may be independent of the processor 110, and is disposed in a same device with the mobile communications module 150 or another functional module.

The wireless communications module 160 may provide a solution that is applied to the electronic device 100 and that includes wireless communications technologies such as a wireless local area network (WLAN), Bluetooth (BT), a global navigation satellite system (GNSS), frequency modulation (FM), a near field communication (NFC) technology, and an infrared (IR) technology. The wireless communications module 160 may be one or more devices that integrate at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave and radiate the electromagnetic wave by using the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is used for graphics rendering. The processor 110 may include one or more GPUs that execute a program instruction to generate or change display information.

The display screen 194 is configured to display an image, a video, and the like. The display screen 194 includes a display panel. The display panel may be an LCD (liquid crystal display), an OLED (organic light-emitting diode), an active-matrix organic light emitting diode (AMOLED), a flexible light-emitting diode (FLED), a mini LED, a micro LED, a micro OLED, a quantum dot light emitting diode (QLED), or the like. In some embodiments, the electronic device 100 may include one or N display screens, where N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transmits the electrical signal to the ISP for processing, to convert the electrical signal into an image visible to a naked eye. The ISP may further optimize noise, luminance, and complexion of the image based on an algorithm. The ISP may further optimize parameters such as exposure and color temperature of a photographing scenario. In some embodiments, the ISP may be disposed in the camera 193.

The camera 193 is configured to capture a static image or a video. An optical image is generated for an object by using the lens, and the optical image is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. In this way, the electronic device 100 may play or record videos in a plurality of encoding formats, for example, MPEG-1, MPEG-2, MPEG-3, and MPEG-4.

The NPU is a neural-network (NN) computing processor. The NPU quickly processes input information with reference to a structure of a biological neural network, for example, with reference to a transfer mode between human brain neurons, and may further continuously perform self-learning. The NPU may implement applications such as intelligent cognition of the electronic device 100, for example, image recognition, facial recognition, speech recognition, and text comprehension.

The external memory interface 120 may be configured to connect to an external storage card, for example, a micro SD card, to extend a storage capability of the electronic device 100. The external storage card communicates with the processor 110 by using the external memory interface 120, to implement a data storage function. For example, files such as music and videos are stored in the external storage card.

The internal memory 121 may be configured to store computer executable program code, where the executable program code includes an instruction. The processor 110 performs various functional applications and data processing of the electronic device 100 by running the instruction stored in the internal memory 121. The memory 121 may include a program storage area and a data storage area. The program storage area may store an operating system, an application program required by at least one function (for example, a sound play function or an image play function), and the like. The data storage area may store data (for example, audio data and a phone book) created in a process of using the electronic device 100, and the like. In addition, the memory 121 may include a high-speed random access memory, or may include a nonvolatile memory, for example, at least one magnetic disk storage device, a flash storage device, or a universal flash storage (UFS).

The electronic device 100 may implement audio functions, for example, music playing and recording, by using the audio module 170, the speaker 170A, the receiver 170B, the microphone 170C, the headset interface 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a hands-free call by using the speaker 170A.

The receiver 170B, also referred to as an "earpiece", is configured to convert an audio electrical signal into a sound signal. When the electronic device 100 is used to answer a call or listen to voice information, the receiver 170B may be placed close to a human ear to listen to a voice.

The microphone 170C, also referred to as a "mike" or a "mic", is configured to convert a sound signal into an electrical signal. When making a call or sending voice information, a user may move a mouth close to the microphone 170C and make a sound, to input a sound signal into the microphone 170C. At least one microphone 170C may be disposed in the electronic device 100. In some other embodiments, two microphones may be disposed in the electronic device 100, to implement a noise reduction function, in addition to collecting a sound signal. In some other embodiments, three, four, or more microphones may be alternatively disposed in the electronic device 100, to collect a sound signal and reduce noise. The microphones may further identify a sound source, implement a directional recording function, and the like.

The headset interface 170D is configured to connect to a wired headset. The headset interface may be a USB interface, or may be a 3.5-mm open mobile terminal platform (OMTP) standard interface, or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display screen 194. There are many types of pressure sensors 180A, for example, a resistive pressure sensor, an inductive pressure sensor, and a capacitive pressure sensor. The capacitive pressure sensor may include at least two parallel plates that have conductive materials. When a force acts on the pressure sensor 180A, capacitance between electrodes changes. The electronic device 100 determines pressure strength based on the capacitance change. When a touch operation acts on the display screen 194, the electronic device 100 detects strength of the touch operation based on the pressure sensor 180A. The electronic device 100 may also calculate a touch position based on a detection signal of the pressure sensor 180A. In some embodiments, touch operations acting on a same touch position but having different touch operation strength may correspond to different operation instructions. For example, when a touch operation whose touch operation strength is less than a first pressure threshold acts on an icon of an SMS application, an instruction for viewing an SMS message is executed; or when a touch operation whose touch operation strength is greater than or equal to the first pressure threshold acts on the icon of the SMS application, an instruction for creating an SMS message is executed.

The gyroscope sensor 180B may be configured to determine a motion posture of the electronic device 100. In some embodiments, an angular velocity of the electronic device 100 around three axes (that is, an x-axis, a y-axis, and a z-axis) may be determined by using the gyroscope sensor 180B. The gyroscope sensor 180B may be used for image stabilization during photographing. For example, when the shutter is pressed, the gyroscope sensor 180B detects an angle at which the electronic device 100 shakes, and calculates, based on the angle, a distance for which a lens module needs to compensate, so that the lens cancels the shake of the electronic device 100 through reverse motion, thereby implementing image stabilization. The gyroscope sensor 180B may be further used in navigation and motion sensing game scenarios.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening/closing of a clamshell leather case by using the magnetic sensor 180D. In some embodiments, when the electronic device 100 is a clamshell phone, the electronic device 100 may detect opening/closing of a clamshell based on the magnetic sensor 180D. Further, a feature, such as automatic unlocking upon flipping, is set based on a detected open/closed state of a leather case or a detected open/closed state of the clamshell.

The acceleration sensor 180E may detect a magnitude of an acceleration of the electronic device 100 in each direction (usually, three axes). When the electronic device 100 is still, a magnitude and a direction of gravity may be detected. The acceleration sensor 180E may be further configured to identify a posture of the electronic device, and is applied to applications such as landscape/portrait mode switching and a pedometer.

The distance sensor 180F is configured to measure a distance. The electronic device 100 may measure a distance by using an infrared or laser technology. In some embodiments, in a photographing scenario, the electronic device 100 may measure a distance by using the distance sensor 180F, to implement fast focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects, by using the photodiode, infrared reflected light that comes from a nearby object. When detecting sufficient reflected light, the electronic device 100 may determine that there is an object near the electronic device 100; or when detecting insufficient reflected light, the electronic device 100 may determine that there is no object near the electronic device 100. The electronic device 100 may detect, by using the optical proximity sensor 180G, that a user holds the electronic device 100 close to an ear for a call, so as to automatically turn off the screen to save power. The optical proximity sensor 180G may also be used for automatic screen locking or unlocking in a leather case mode or a pocket mode.

The ambient light sensor 180L is configured to sense luminance of ambient light. The electronic device 100 may adaptively adjust luminance of the display screen 194 based on the sensed luminance of ambient light. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, unlocking for application access, fingerprint-based photographing, fingerprint-based call answering, and the like by using a collected fingerprint characteristic.

The temperature sensor 180J is configured to detect temperature. In some embodiments, the electronic device 100 executes a temperature processing policy by using the temperature detected by the temperature sensor 180J. For example, when temperature reported by the temperature sensor 180J exceeds a threshold, the electronic device 100 degrades performance of a processor near the temperature sensor 180J, to reduce power consumption and implement thermal protection. In some other embodiments, when temperature is lower than another threshold, the electronic device 100 heats up the battery 142, to avoid abnormal shutdown of the electronic device 100 due to low temperature. In some other embodiments, when temperature is lower than still another threshold, the electronic device 100 boosts an output voltage of the battery 142 to avoid abnormal shutdown due to low temperature.

The touch sensor 180K is also referred to as a "touch panel". The touch sensor 180K may be disposed in the display screen 194, and is configured to detect a touch operation acting on or near the touch sensor 180K. The touch sensor 180K may transmit the detected touch operation to the application processor, to determine a type of a touch event, and corresponding visual output is provided by using the display screen 194. In some other embodiments, the touch sensor 180K may be alternatively disposed on a surface of the electronic device 100, and is at a position different from that of the display screen 194.

The bone conduction sensor 180M may obtain a vibration signal. In some embodiments, the bone conduction sensor 180M may obtain a vibration signal from a vibration bone of a human voice part. The bone conduction sensor 180M may also be in contact with a human pulse, and receive a blood pressure and pulse signal. In some embodiments, the bone conduction sensor 180M may be alternatively disposed in a headset. The audio module 170 may parse out a speech signal based on the vibration signal obtained by the bone conduction sensor 180M from the vibration bone of the voice part, to implement a speech function. The application processor may parse out heart rate information based on the blood pressure and pulse signal obtained by the bone conduction sensor 180M, to implement a heart rate detection function.

The key 190 includes a power key, a volume key, or the like. The key may be a mechanical key, or may be a touch key. The electronic device 100 may receive key input, and generate key signal input related to user settings and function control of the electronic device 100.

The motor 191 may produce a vibration prompt. The motor 191 may be configured to produce a vibration prompt for an incoming call, or may be configured to produce a vibration feedback on a touch. For example, touch operations acting on different applications (for example, photographing and audio playing) may correspond to different vibration feedback effects. For touch operations acting on different areas on the display screen 194, the motor 191 may also correspondingly produce different vibration feedback effects. Different application scenarios (for example, a time reminder, information receiving, an alarm clock, and a game) may also correspond to different vibration feedback effects. A touch vibration feedback effect may be further customized.

The indication device 192 may be an indicator, and may be configured to indicate a charging status and a battery level change, or may be configured to indicate a message, a missed call, a notification, or the like.

The SIM card interface 195 is configured to connect to a subscriber identity module (SIM) card. The SIM card may be inserted in the SIM card interface or removed from the SIM card interface, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted in one SIM card interface. The plurality of cards may be of a same type, or may be of different types. The SIM card interface 195 may also be compatible with different types of SIM cards. The SIM card interface 195 may also be compatible with an external storage card. The electronic device 100 interacts with a network by using the SIM card, to implement functions such as a call and data communication. In some embodiments, the electronic device 100 uses an eSIM, that is, an embedded SIM card. The eSIM card may be embedded in the electronic device 100, and cannot be separated from the electronic device 100. A hierarchical architecture, an event-driven architecture, a micro-core architecture, a micro-service architecture, or a cloud architecture may be used for a software system of the electronic device 100. In this embodiment of the present invention, an Android system with a hierarchical architecture is used as an example to describe a software structure of the electronic device 100.

Figure 6:
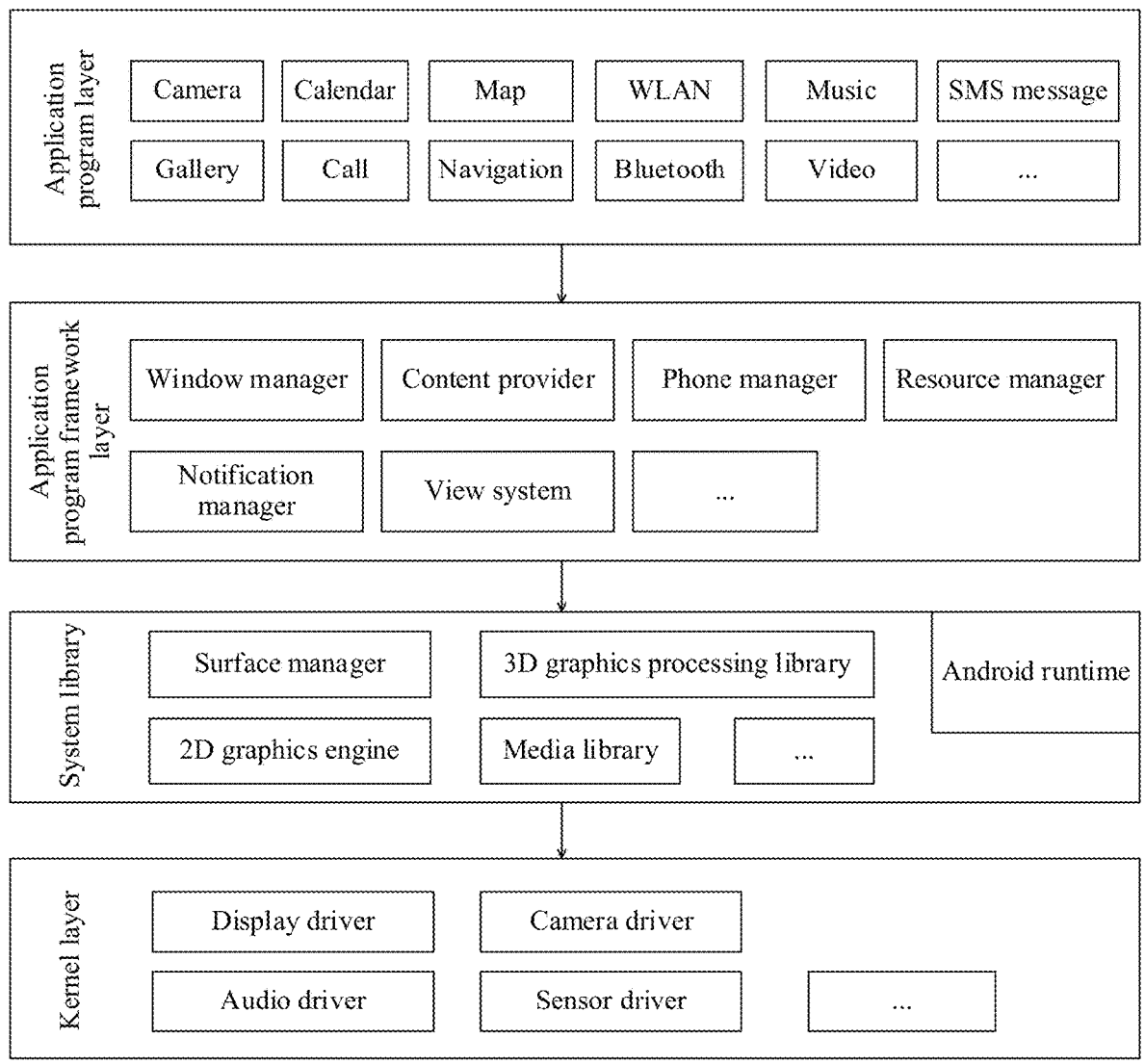
FIG. 6 is a schematic architectural diagram of an Android system according to an embodiment of this application.

FIG. 6 is a block diagram of a software structure of an electronic device 100 according to an embodiment of the present invention.

A hierarchical architecture divides software into several layers. Each layer has a clear role and responsibility. Layers communicate with each other by using a software interface. In some embodiments, an Android system is divided into four layers from top to bottom: an application program layer, an application program framework layer, an Android runtime and a system library, and a kernel layer.

The application program layer may include a series of application program packages.

As shown in FIG. 6, an application program package may include application programs such as a camera, a gallery, a calendar, a call, a map, navigation, a WLAN, Bluetooth, music, a video, and an SMS message.

The application program framework layer provides an application programming interface (API) and an application programming framework for an application program at the application program layer. The application program framework layer includes some predefined functions.

As shown in FIG. 6, the application program framework layer may include a window manager, a content provider, a view system, a phone manager, a resource manager, a notification manager, and the like.

The window manager is configured to manage a window program. The window manager may obtain a size of the display screen, determine whether there is a status bar, lock the screen, take a screenshot, and the like.

The content provider is configured to store and obtain data, and make the data accessible to an application program. The data may include a video, an image, an audio file, a call made and a call answered, a browsing history and a bookmark, a phone book, and the like.

The view system includes a visual control, for example, a word display control or a picture display control. The view system may be configured to build an application program. A display interface may include one or more views. For example, a display interface including an SMS notification icon may include a word display view and a picture display view.

The phone manager is configured to provide a communication function of the electronic device 100. For example, the phone manager manages a call status (including answering, hanging up, and the like).

The resource manager provides various resources for an application program, for example, a localized string, an icon, a picture, a layout file, and a video file.

The notification manager enables an application program to display notification information in a status bar, and may be configured to deliver a notification-type message. The message may automatically disappear after short display, without user interaction. For example, the notification manager is configured to notify download completion or give a message reminder. Alternatively, the notification manager may be a notification that appears in a top status bar of the system in a form of a chart or a scroll-bar text, for example, a notification for an application program running at the background; or may be a notification that appears on the screen in a form of a dialog window. For example, text information is prompted in the status bar, a prompt tone is played, the electronic device vibrates, or an indicator blinks.

The Android runtime includes a core library and a virtual machine. The Android runtime is responsible for scheduling and managing the Android system.

The core library includes two parts: a performance function that needs to be invoked for Java language, and an Android core library.

The application program layer and the application program framework layer run in the virtual machine. The virtual machine executes Java files at the application program layer and the application program framework layer as binary files. The virtual machine is configured to perform functions such as managing a life cycle of an object, managing a stack, managing a thread, managing security and an exception, and collecting garbage.

The system library may include a plurality of functional modules, for example, a surface manager, a media library, a 3D graphics processing library (for example, OpenGL ES), and a 2D graphics engine (for example, SGL).

The surface manager is configured to manage a display subsystem, and provide 2D and 3D layer fusion for a plurality of application programs.

The media library supports playback and recording in a plurality of common audio and video formats, static image files, and the like. The media library may support a plurality of audio and video encoding formats, for example, MPEG-4, H.264, MP3, AAC, AMR, JPG, and PNG.

The 3D graphics processing library is configured to implement 3D graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a capturing and photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application program framework layer obtains the original input event from the kernel layer, and identifies a control corresponding to the input event. For example, the touch operation is a tap operation, and a control corresponding to the tap operation is a control of an icon of a camera application. The camera application invokes an interface of the application framework layer to start the camera application, and further invokes the kernel layer to start the camera driver, to capture a static image or a video by using the camera.

All the following embodiments may be implemented on the electronic device 100 with the foregoing hardware structure. In the following embodiments, an example in which a terminal device is the electronic device 100 is used to describe the data transmission method provided in the embodiments of this application.

An embodiment of this application provides a data transmission method. The method includes: establishing, by an electronic device 100, an MPTCP connection to a first application server, where the MPTCP connection includes a first TCP connection and a second TCP connection, and a data transmission delay of the first TCP connection is less than that of the second TCP connection; and adjusting, by the electronic device 100, a receiving policy based on indication information received from the first application server, and receiving, according to an adjusted receiving policy, a data stream sent by the first application server.

Specifically, when a type identifier included in the indication information received by the electronic device 100 from the first application server is a first identifier, the electronic device 100 may receive, in a first time period after the electronic device 100 receives the indication information, the data stream preferentially by using the first TCP connection with a comparatively short data transmission delay; or when the type identifier included in the indication information received by the electronic device 100 from the first application server is a second identifier, the electronic device 100 may receive, in a second time period after the electronic device 100 receives the indication information, the data stream from the first application server preferentially by using the second TCP with a comparatively long data transmission delay. It should be noted that the indication information sent by the first application server is related to the data stream subsequently sent by the first application server, and there is a time sequence for sending the indication information and the data stream. For example, if the type identifier included in the indication information sent by the first application server is the first identifier, the data stream sent by the first application server immediately after the indication information is sent is a data stream related to the first identifier. The second TCP connection with a comparatively long data transmission delay is usually a TCP connection corresponding to a Wi-Fi network, and the first TCP connection with a comparatively short data transmission delay is usually a TCP connection corresponding to a cellular network. Therefore, compared with a minimum round-trip time scheduling algorithm in the prior art, according to the method in this embodiment of this application, consumption of cellular-network data traffic on the terminal device side can be reduced to some extent.

The following describes in detail the data transmission method provided in this embodiment of this application with reference to accompanying drawings and application scenarios mainly by using an example in which the electronic device 100 plays streaming media that comes from the first application server.

It should be noted that, currently, comparatively typical streaming media services of a smartphone are roughly classified into three types: short videos, for example, Tik-Tok; video on demand (VOD), for example, iQIYI and Youku; live broadcast, for example, Huya.

In this embodiment of this application, when creating a data stream of a streaming media file, the first application server determines a type identifier of each segment of data stream, and generates indication information corresponding to the type identifier of the segment of data stream. In a case, the first application server determines that the segment of data stream is a data stream corresponding to an initial time period (0 s to 30 s) of an on-demand video, or a data stream corresponding to a specified time period starting from a last play moment when a user plays an on-demand video that has been played on demand, or a data stream corresponding to a specified time period starting from a time point in the middle of an on-demand video when a user drags a progress bar to the time point, or a data stream corresponding to an initial time period of a live video, or a data stream corresponding to a current video in short videos. Because these data streams have a comparatively high requirement on a delay, the electronic device 100 needs to display this type of data stream immediately after receiving the data stream. Therefore, the first application server generates indication information for this type of data stream when creating the data stream. A type identifier included in the indication information is the first identifier, and the first identifier is used to indicate that the data stream requires a comparatively short delay.

In another case, the first application server determines that the segment of data stream is a data stream corresponding to a cached time period of an on-demand video (usually, the cached time period includes dozens of seconds after a time period corresponding to a video that is being played), or a data stream corresponding to a cached time period of a live video, or a data stream corresponding to a cached short video in short videos. Because these data streams do not have a high requirement on a delay, the electronic device 100 usually does not need to display this type of data stream immediately after receiving the data stream. Therefore, the first application server generates indication information for this type of data stream when creating the data stream. A type identifier included in the indication information is the first identifier, and the second identifier is used to indicate that the data stream requires a comparatively long delay.

In other words, after establishing the MPTCP connection to the first application server, the electronic device 100 receives the type identifier of the data stream before receiving the data stream sent by the first application server. The electronic device 100 first obtains the type identifier from the indication information, and then adjusts, based on the type identifier, the policy for receiving the data stream sent by the first application server in a time period after the indication information is received. With reference to FIG. 4, it is assumed that the electronic device 100 and the first application server use both a Wi-Fi network resource and an LTE network resource for data transmission. After the electronic device 100 establishes the MPTCP connection to the first application server, the first TCP connection included in the MPTCP connection is a TCP connection corresponding to the LTE network, and the second TCP connection is a TCP connection corresponding to the Wi-Fi network. When the electronic device 100 determines that the type identifier included in the received indication information is the first identifier, because a round-trip time of the TCP connection corresponding to the LTE network is less than that of the Wi-Fi network, the electronic device 100 receives the data stream preferentially by using the TCP connection corresponding to the LTE network. To receive the data stream at a comparatively high rate, the electronic device 100 alternatively receives, by using both the TCP connections, the data stream sent by the first application server. When determining that the type identifier included in the received indication information is the second identifier, the electronic device 100 may receive, preferentially by using the TCP connection corresponding to the Wi-Fi network, the data stream subsequently sent by the first application server.

It should be noted that, in FIG. 4, a specific method for receiving, by the electronic device 100, the data stream preferentially by using the TCP connection corresponding to the LTE network may be: adjusting, by the electronic device 100, a receive window of the TCP connection corresponding to the LTE network, so that the receive window of the TCP connection corresponding to the LTE network is greater than that of the TCP connection corresponding to the Wi-Fi network. Certainly, to improve efficiency for receiving the data stream and minimize a play start delay, the electronic device 100 may alternatively maximize, through adjustment, both the receive window of the TCP connection corresponding to the LTE network and the receive window of the TCP connection corresponding to the Wi-Fi network. This can improve receiving efficiency and achieve a maximum throughput.

In addition, in FIG. 4, a specific method for receiving, by the electronic device 100, the subsequent data stream preferentially by using the TCP connection corresponding to the Wi-Fi network may be: adjusting, by the electronic device 100, a receive window of the TCP connection corresponding to the Wi-Fi network, so that the receive window of the TCP connection corresponding to the Wi-Fi network is greater than that of the TCP connection corresponding to the LTE network. Certainly, to reduce costs, the electronic device 100 may alternatively maximize, through adjustment, the receive window of the TCP connection corresponding to the Wi-Fi network, and close the receive window of the TCP connection corresponding to the LTE network.

In other words, the electronic device 100 receives, only by using the TCP connection corresponding to the Wi-Fi network, the data stream subsequently sent by the first application server. This can minimize traffic consumption of the LTE network and reduce consumption costs of a user.

In a possible implementation, in addition to the type identifier indicating the data stream, the indication information generated by the first application server may further carry a parameter indicating a bandwidth requirement. In a case, if the identifier obtained by the electronic device 100 from the indication information is the second identifier and the indication information further includes the parameter indicating the bandwidth requirement, the electronic device 100 determines whether a bandwidth value of the second TCP connection meets the bandwidth requirement when the receive window of the second TCP connection is maximized through adjustment. If the bandwidth value of the second TCP connection meets the bandwidth requirement, the electronic device 100 may receive, only by using the second TCP connection, the data stream subsequently sent by the first application server; or if the bandwidth value of the second TCP connection does not meet the bandwidth requirement, the electronic device 100 may maximize, through adjustment, the receive window of the second TCP connection, and also adjust the receive window of the first TCP connection, until a sum of bandwidth of the two TCP connections can meet bandwidth requirement. When the first TCP connection corresponds to the cellular network and the second TCP connection corresponds to the Wi-Fi network, according to the method, when receiving the data stream subsequently sent by the first application server, the electronic device 100 may occupy data traffic of the Wi-Fi network as much as possible, and occupy less data traffic of the cellular network, to reduce consumption of data traffic of the cellular network.

In another case, if the identifier obtained by the electronic device 100 from the indication information is the first identifier and the indication information further includes the parameter indicating the bandwidth requirement, the electronic device 100 receives, preferentially by using the first TCP connection with a minimum round-trip time, the data stream subsequently sent by the first application server. If the bandwidth requirement is still not met when the receive window of the first TCP connection is maximized, the data stream is received also by using the second TCP connection with a second shortest round-trip time. For example, when the first TCP connection corresponds to the cellular network and the second TCP connection corresponds to the Wi-Fi network, the electronic device 100 receives, preferentially by using the TCP connection corresponding to the cellular network, the data stream subsequently sent by the first application server. If the bandwidth requirement 4 Mb/s is still not met when the receive window of the TCP connection corresponding to the cellular network is maximized through adjustment, the TCP connection corresponding to the Wi-Fi network is also used. Because the Wi-Fi network is usually free-of-charge, in this embodiment of this application, the electronic device 100 may maximize, through adjustment, the receive window of the TCP connection corresponding to the Wi-Fi network, so that the electronic device 100 can receive the data stream as quickly as possible, to improve receiving efficiency and reduce a play start delay of the electronic device 100.

Figure 7:
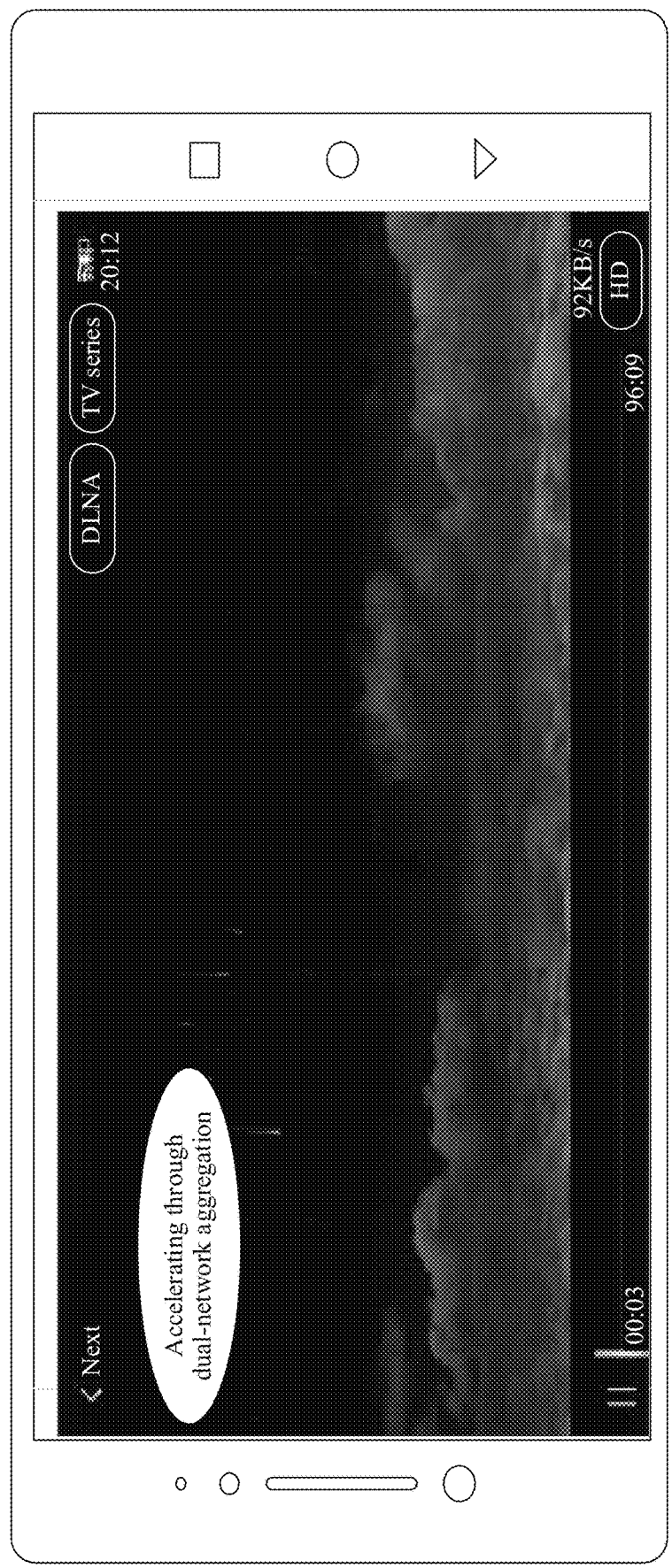
FIG. 7 is an interface diagram 1 of a video play scenario according to an embodiment of this application.
Figure 8:
FIG. 8 is an interface diagram 2 of a video play scenario according to an embodiment of this application.

This embodiment of this application further describes the foregoing data stream transmission method by using examples with reference to scenarios shown in FIG. 7 and FIG. 8.

Scenario 1: When receiving an operation (for example, a click/tap operation) performed by a user 1 on a play control on a Huawei video play interface, the electronic device 100 sends, to a first application server corresponding to a Huawei video application, a message for requesting to obtain a multimedia file of "Next". After receiving the message, the first application server sends a data stream of the multimedia file to the electronic device 100 by using the MPTCP protocol. The electronic device 100 receives the data stream according to the foregoing data stream transmission method, and displays an interface shown in FIG. 7.

Specifically, because the first application server corresponding to the Huawei video sends indication information before sending each segment of data stream, after receiving the indication information from the first application server, the electronic device 100 obtains a first identifier and a parameter indicating a bandwidth requirement from the indication information, and the electronic device 100 receives the data stream preferentially by using the first TCP connection corresponding to a comparatively short round-trip time. For example, when the first TCP connection corresponds to the cellular network and the second TCP connection corresponds to the Wi-Fi network, the electronic device 100 receives the data stream preferentially by using the TCP connection corresponding to the LTE network. If the bandwidth requirement of the data stream is still not met when the receive window of the TCP connection corresponding to the LTE network is maximized through adjustment, the data stream may be received also by using the TCP connection corresponding to the Wi-Fi network. In this way, after detecting the operation of the user 1, the electronic device 100 can quickly start to play a first screen of the multimedia file of "Next", in other words, a play start delay is comparatively short, thereby improving user experience.

In an embodiment, an interface displayed by the electronic device 100 for initially playing the multimedia file of "Next" may further include first prompt information. The first prompt information is used to notify the user that the electronic device 100 is currently using a plurality of network resources to accelerate playing. For example, first prompt information displayed on the interface shown in FIG. 7 is as follows: Accelerating through dual-network aggregation.

Scenario 2: As shown in FIG. 8, in a process in which the electronic device 100 plays a multimedia file of "Next", the electronic device 100 further receives a data stream of a cached time period from a first application server, and before sending the data stream of the cached time period, the first application server sends, to the electronic device 100, indication information corresponding to a type identifier of the data stream of the cached time period. After receiving the indication information from the first application server, the electronic device 100 obtains a second identifier and a parameter indicating a bandwidth requirement from the indication information. The electronic device 100 receives the data stream preferentially by using a TCP connection corresponding to a local area network. For example, the electronic device 100 receives the data stream preferentially by using the TCP connection corresponding to the Wi-Fi network. If the bandwidth requirement of the data stream is still not met when the receive window of the TCP connection corresponding to the Wi-Fi network is maximized through adjustment, the data stream may be received also by using the TCP connection corresponding to the LTE network.

In an embodiment, an interface of the electronic device 100 may further display second prompt information. The second prompt information is used to notify a user that the electronic device 100 is currently loading data by using the Wi-Fi network. For example, second prompt information displayed on an interface shown in FIG. 8 is as follows: Pre-caching by using a Wi-Fi network.

Scenario 3: In a process in which a Huawei video application on the electronic device 100 plays a multimedia file of "Next", the Huawei video application on the electronic device 100 downloads a movie "The Island" at the background. When starting to download a multimedia file of the movie "The Island", the electronic device 100 sends a request to a Huawei video application server. The Huawei video application server determines, according to the request, that a type identifier of a data stream of the multimedia file of the movie "The Island" is the second identifier. When requesting to play the multimedia file of "Next", the electronic device 100 sends a request to the Huawei video application server. The Huawei video application server determines, according to the request, that an identifier of a data stream of an initial time period is the first identifier and an identifier of a data stream of a cached time period is the second identifier. Therefore, after receiving indication information from the Huawei video application server, the electronic device 100 obtains the first identifier from the indication information, and the electronic device 100 receives the data stream preferentially by using the TCP connection that corresponds to the LTE network and that corresponds to a comparatively short round-trip time; after receiving indication information from the Huawei video application server, the electronic device 100 obtains the second identifier from the indication information, and the electronic device 100 receives the data stream preferentially by using the TCP connection that corresponds to the Wi-Fi network and that corresponds to a comparatively long round-trip time.

Scenario 4: In a process in which a Huawei video application on the electronic device 100 plays a multimedia file of "Next", a Youku application on the electronic device 100 plays a movie "The Island" in a split-screen manner, and both the Huawei video application and the Youku application correspond to a Youku application server. When requesting to play the multimedia file of "Next", the electronic device 100 sends a request to the Youku application server. The Youku application server determines, according to the request, that an identifier of a data stream of an initial time period is the first identifier and an identifier of a data stream of a cached time period is the second identifier. When requesting to play a multimedia file of "The Island", the electronic device 100 sends a request to the Youku application server. The Youku application server determines, according to the request, that an identifier of a data stream of an initial time period is the first identifier and an identifier of a data stream of a cached time period is the second identifier. Therefore, after receiving indication information from the Youku application server, the electronic device 100 obtains the first identifier from the indication information, and the electronic device 100 receives the data stream preferentially by using the TCP connection that corresponds to the LTE network and that corresponds to a comparatively short round-trip time; after receiving indication information from the Youku application server, the electronic device 100 obtains the second identifier from the indication information, and the electronic device 100 receives the data stream preferentially by using the TCP connection that corresponds to the Wi-Fi network and that corresponds to a comparatively long round-trip time.

It can be learned that the electronic device 100 receives the data stream from the first application server by using the foregoing data transmission method, so that when the multimedia file of "Next" is played, a play start delay can be comparatively short, and a user waiting time can be comparatively short. In addition, the data stream of the cached time period can be received by using the Wi-Fi network as much as possible. This can reduce, to some extent, consumption of data traffic corresponding to the LTE network, thereby reducing consumption costs of a user.

It is assumed that data is transmitted between the electronic device 100 and the first application server by using a Wi-Fi network resource and an LTE network resource. The following embodiment of this application further describes in detail a specific process of the foregoing data transmission method with reference to a process shown in FIG. 9A and FIG. 9B. The specific process of the method may include the following operations.

Operation 201: An electronic device 100 opens an interface to a first application server, and receives indication information sent by the first application server by using the interface. The indication information includes an identifier and a parameter indicating a bandwidth requirement, and the indication information is related to a data stream to be sent by the first application server.

Operation 202: The electronic device 100 obtains, from the indication information, the type identifier and the parameter indicating the bandwidth requirement.

Operation 203: When determining that the type identifier in the indication information is a first identifier, the electronic device 100 performs operation 204; otherwise, the electronic device 100 performs operation 214. For example, the first identifier is 0X01.

Operation 204: The electronic device 100 receives, preferentially by using a TCP connection corresponding to an LTE network, the data stream subsequently sent by the first application server.

Operation 205: The electronic device 100 determines whether bandwidth is higher than or equal to the bandwidth requirement when a receive window of the TCP connection corresponding to the LTE network is maximized; and if the bandwidth is lower than the bandwidth requirement, performs operation 206; otherwise, goes back to continue to perform operation 204.

Operation 206: The electronic device 100 receives the data stream by using the TCP connection corresponding to the LTE network, where the receive window is maximized; and the electronic device 100 receives the data stream by using a connection corresponding to a Wi-Fi network, where a receive window is maximized.

Operation 207: The electronic device 100 determines whether the type identifier in the indication information is a second identifier. For example, the second identifier is 0X02. If the type identifier is the second identifier, the electronic device 100 performs operation 208; otherwise, the electronic device 100 performs operation 214.

Operation 208: The electronic device 100 receives, preferentially by using a TCP connection corresponding to a Wi-Fi network, the data stream subsequently sent by the first application server.

Operation 209: The electronic device 100 determines whether bandwidth is higher than or equal to the bandwidth requirement when a receive window of the TCP connection corresponding to the Wi-Fi network is maximized; and if the bandwidth is higher than or equal to the bandwidth requirement, performs operation 210a; otherwise, goes back to continue to perform operation 207.

Operation 210a: The electronic device 100 receives the data stream by using both the TCP connection corresponding to the Wi-Fi network and a TCP connection corresponding to an LTE network, where both receive windows are maximized.

Operation 211a: The electronic device 100 determines whether a current sum of bandwidth of the Wi-Fi network and the LTE network is equal to the bandwidth requirement; and if the current sum of bandwidth is not equal to the bandwidth requirement, performs operation 212a; otherwise, performs operation 213a.

Operation 212a: The electronic device 100 reduces, based on a specified proportion (for example, 10%), a size of the receive window of the TCP connection corresponding to the LTE network, goes back to perform operation 211a until a current sum of bandwidth is equal to the bandwidth requirement, and then proceeds to operation 213a.

Operation 213a: When the current sum of bandwidth is equal to the bandwidth requirement, each TCP connection of the electronic device 100 receives the data stream based on a current receive window size.

Operation 214: The electronic device 100 receives the data stream by using both a TCP connection corresponding to an LTE network and a TCP connection corresponding to a Wi-Fi network.

It should be noted that after performing operation 213a, the electronic device 100 usually continues to periodically detect whether a current sum of bandwidth meets the requirement, that is, performs operation 211a to operation 213a again.

In this embodiment of this application, if the identifier in the indication information is the second identifier, the receive window of the TCP connection that corresponds to the Wi-Fi network and that is used by the electronic device 100 is usually a maximum receive window. This can increase a rate for receiving the data stream. In addition, the electronic device 100 first performs operation 210a when the Wi-Fi network resource does not meet the bandwidth requirement because a process of performing operation 211a to operation 213a needs to occupy specific duration. To avoid congestion of a data stream in a process of adjusting the receive window and avoid impact on user experience, in this embodiment of this application, both the receive window of the TCP connection corresponding to the Wi-Fi network and the receive window of the connection corresponding to the LTE network are preferentially maximized instantaneously, and then the size of the receive window of the connection corresponding to the LTE network is gradually reduced until the bandwidth requirement is met.

Figure 9A:
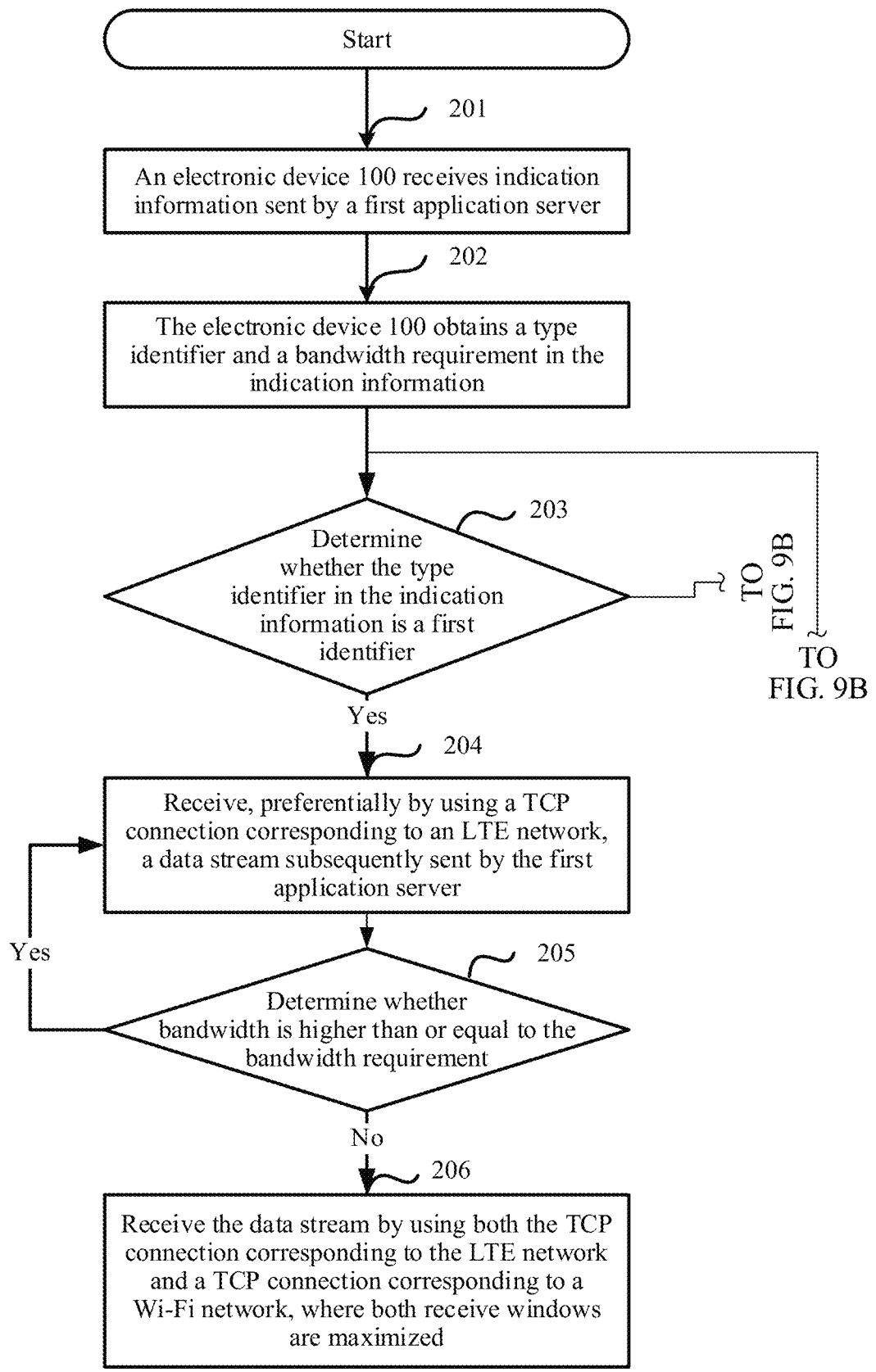
FIG. 9A and FIG. 9B are a schematic flowchart 1 of a data transmission method according to an embodiment of this application.
Figure 9B:
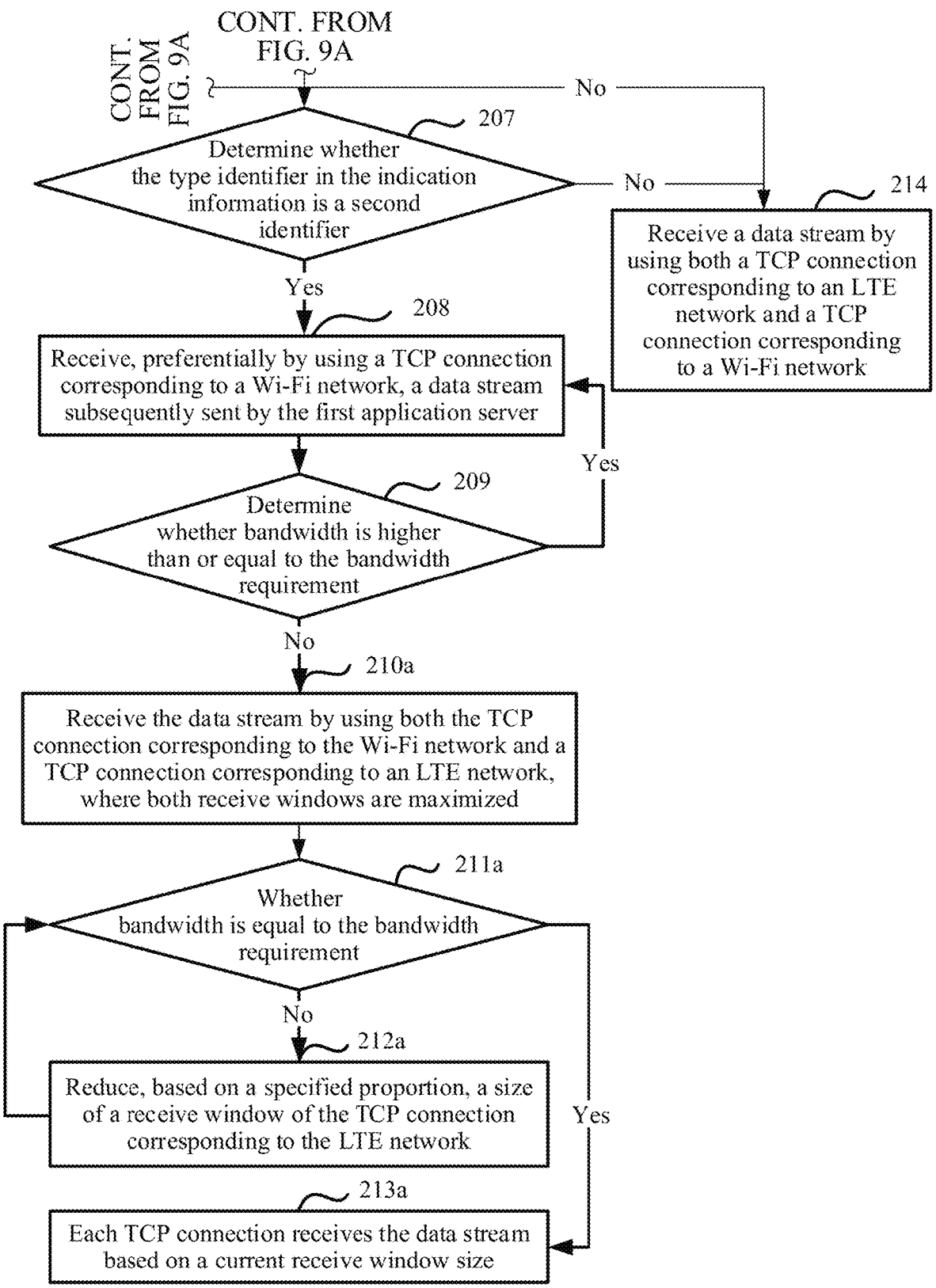
Figure 10A:
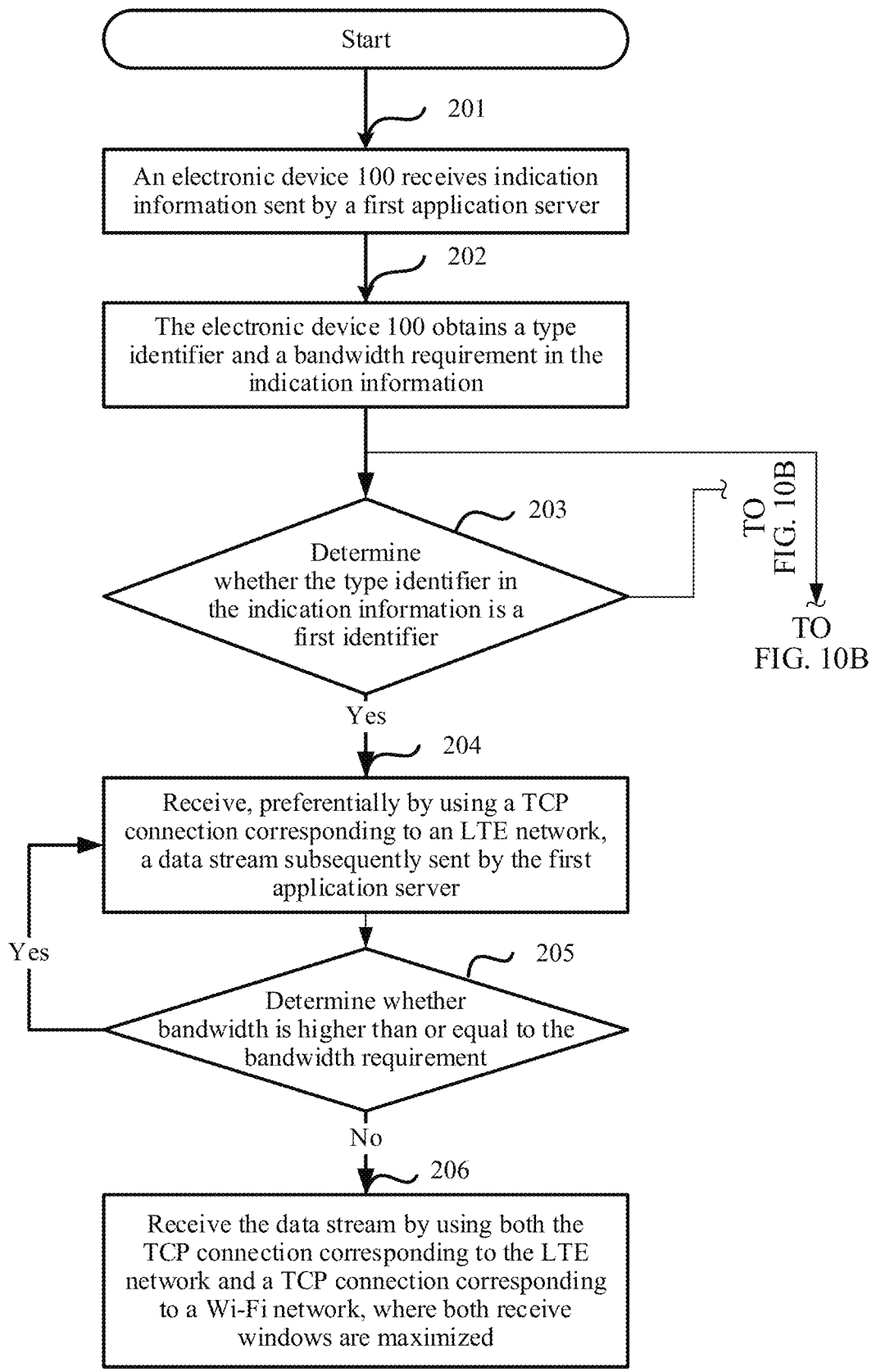
FIG. 10A and FIG. 10B are a schematic flowchart 2 of a data transmission method according to an embodiment of this application.
Figure 10B:
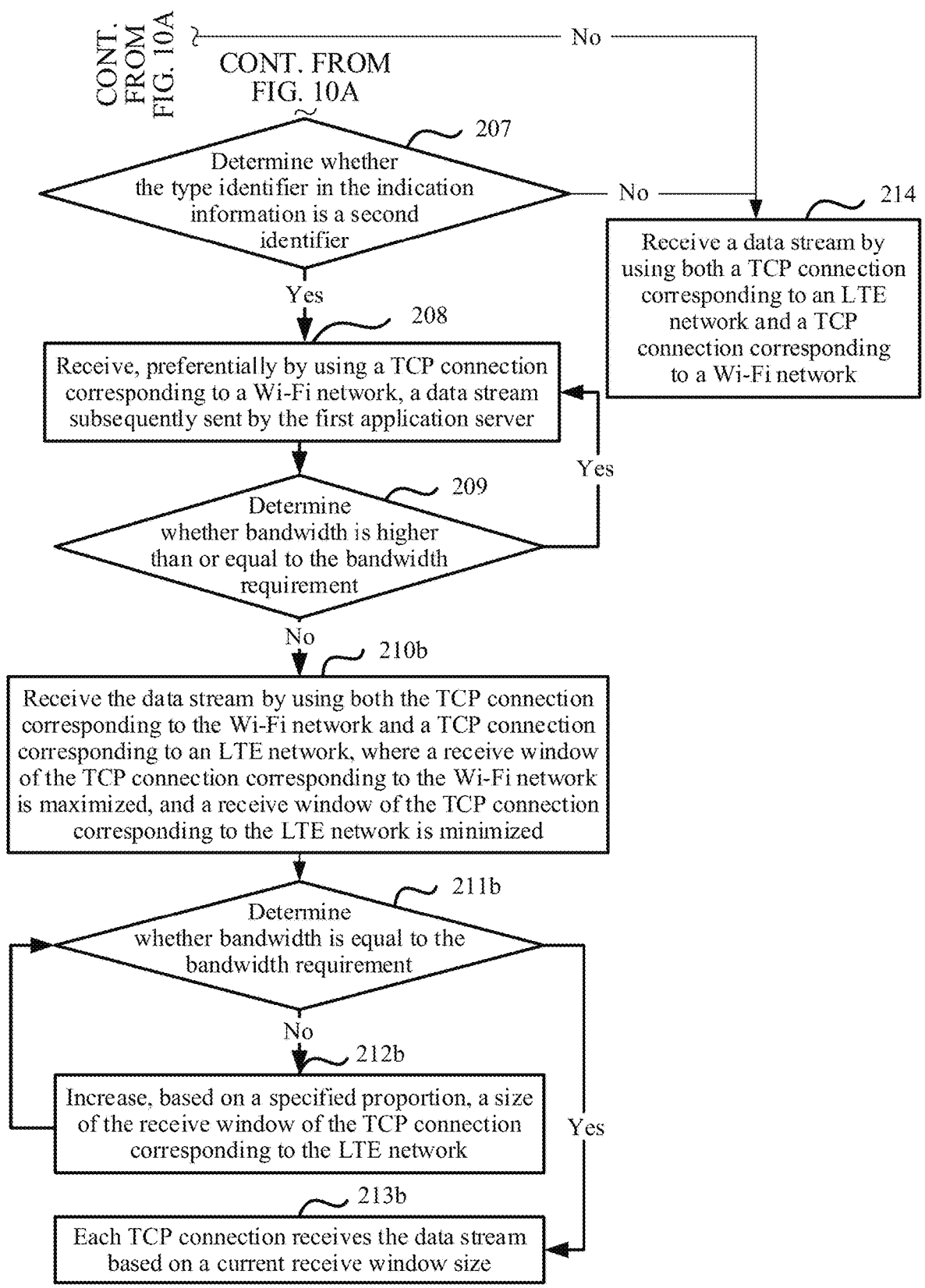

In an embodiment, operation 210a to operation 213a in FIG. 9A and FIG. 9B may be alternatively replaced with operation 210b to operation 213b. To be specific, when determining that the bandwidth is still lower than the bandwidth requirement when the receive window of the TCP connection corresponding to the Wi-Fi network is maximized in operation 209, the electronic device 100 performs operation 210b; otherwise, the electronic device 100 goes back to continue to perform operation 208. As shown in FIG. 10A and FIG. 10B, specific operations are as follows.

Operation 201 to operation 209 are the same as the descriptions of FIG. 9A and FIG. 9B, and details are not described herein again.

Operation 210b: The electronic device 100 receives the data stream by using both the TCP connection corresponding to the Wi-Fi network and the TCP connection corresponding to the LTE network, where the receive window corresponding to the Wi-Fi network is maximized, and the receive window of the TCP connection corresponding to the LTE network is minimized.

Operation 211b: The electronic device 100 determines whether a current sum of bandwidth of the Wi-Fi network and the LTE network is higher than or equal to the bandwidth requirement; and if the current sum of bandwidth is lower than the bandwidth requirement, performs operation 212b; otherwise, performs operation 213b.

Operation 212b: If the current sum of bandwidth is not equal to the bandwidth requirement, the electronic device 100 increases, based on a specified proportion, a size of the receive window of the TCP connection corresponding to the LTE network, goes back to perform operation 211b until a current sum of bandwidth is equal to the bandwidth requirement, and proceeds to operation 213b.

Operation 213b: When the current sum of bandwidth is equal to the bandwidth requirement, each TCP connection of the electronic device 100 receives the data stream based on a current receive window size.

Operation 214: The electronic device 100 receives the data stream by using both a TCP connection corresponding to an LTE network and a TCP connection corresponding to a Wi-Fi network.

It can be learned that, compared with the method process shown in FIG. 9A and FIG. 9B, in the data transmission method implemented in the operations in FIG. 10A and FIG. 10B, data traffic corresponding to the LTE network can be occupied as little as possible, thereby reducing consumption costs of a user.

Figure 11:
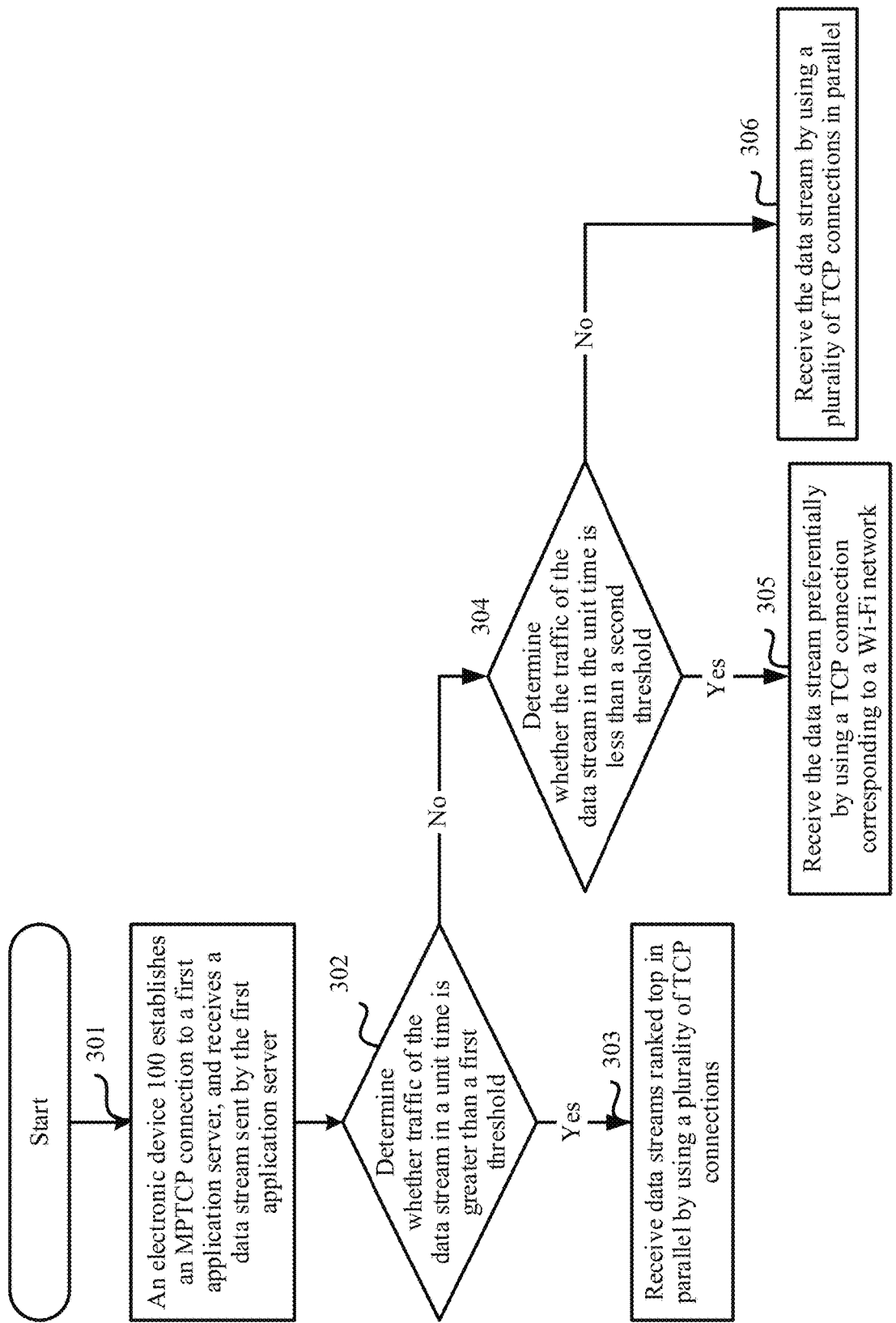
FIG. 11 is a schematic flowchart 3 of a data transmission method according to an embodiment of this application.

An embodiment of this application further provides a data transmission method. According to the method, an electronic device 100 can adjust a data stream receiving policy based on a traffic change rate of a received data stream. The following embodiment of this application further describes in detail a specific process of the foregoing data transmission method with reference to a process shown in FIG. 11. The specific process of the method may include the following operations.

Operation 301: An electronic device 100 establishes an MPTCP connection to a first application server, and receives a data stream sent by the first application server.

The MPTCP connection includes a first TCP connection and a second TCP connection.

A data transmission delay of the first TCP connection is less than that of the second TCP connection. For example, the first TCP connection is a TCP connection corresponding to a cellular network, and the second TCP connection is a TCP connection corresponding to a Wi-Fi network.

Operation 302: The electronic device 100 determines whether a value of traffic of the received data stream in a unit time is greater than a first threshold; and if the value of the traffic is greater than the first threshold, performs operation 303; otherwise, performs operation 304, where the unit time may be in a unit of seconds.

Operation 303: When detecting that the traffic of the received data stream in the unit time is greater than the first threshold, the electronic device 100 obtains a creation time of each data stream from the first application server, sorts all data streams based on creation times of the data streams (for example, a creation time of a socket), and determines N (for example, N is 3) data streams created earlier. The electronic device 100 receives, by using both the first TCP connection and the second TCP connection, the N data streams ranked top, where N is a positive integer greater than or equal to 1.

For example, when a user plays an on-demand movie online in an iQIYI application, the electronic device 100 sends a first request to an iQIYI application server, where the first request is used to request a data stream corresponding to a time period 0 s-1 s of the movie, and the iQIYI application server sends, to the electronic device 100, the data stream corresponding to the time period 0 s-1 s of the movie, that is, a first data stream; subsequently, the electronic device 100 further sends a second request to the iQIYI application server, where the second request is used to request a data stream corresponding to a time period 1-ss of the movie, and the iQIYI application server sends, to the electronic device 100, the data stream corresponding to the time period 1 s-2 s of the movie, that is, a second data stream; the electronic device 100 sends a third request to the iQIYI application server, where the third request is used to request a data stream corresponding to a time period 3 s-5 s of the movie, and the iQIYI application server sends, to the electronic device 100, the data stream corresponding to the time period 3 s-5 s of the movie, that is, a third data stream. In case of sorting by time, the first data stream is created earliest, the second data stream is created next, and the third data stream is created latest. The electronic device 100 obtains a creation time of each data stream from the iQIYI application server, sorts the data streams, and determines the first data stream and the second data stream that are created earlier. Then the electronic device 100 receives the first data stream and the second data stream in parallel by using both the first TCP connection and the second TCP connection.

Operation 304: The electronic device 100 determines whether the value of the traffic of the received data stream in the unit time is less than a second threshold; and if the value of the traffic is less than the second threshold, performs operation 305; otherwise, performs operation 306, where the first threshold is far greater than the second threshold.

Operation 305: When detecting that the traffic of the received data stream in the unit time is less than the second threshold, the electronic device 100 receives the data stream preferentially by using the second TCP connection.

For example, in the foregoing example, the electronic device 100 further sends a fourth request to the iQIYI application server, where the fourth request is used to request a data stream corresponding to a time period 5 s-15 s of the movie, and the iQIYI application server sends, to the electronic device 100, the data stream corresponding to the time period 5 s-15 s of the movie, that is, a fourth data stream. Because a buffer of the electronic device 100 further caches the third data stream, the fourth data stream does not need to be played immediately. In this case, the electronic device 100 receives the fourth data stream preferentially by using the TCP connection corresponding to the Wi-Fi network.

Operation 306: When detecting that the traffic of the received data stream in the unit time is less than or equal to the first threshold and greater than or equal to the second threshold, the electronic device 100 receives the data stream from the first application server by using both the first TCP connection and the second TCP connection in parallel.

It can be learned that, when the first TCP connection is a TCP connection corresponding to the cellular network and the second TCP connection is a TCP connection corresponding to the Wi-Fi network, compared with the prior art, in the foregoing embodiment, the electronic device 100 may receive data by occupying traffic only of the Wi-Fi network when the traffic of the data stream in the unit time is comparatively small, thereby reducing, to some extent, consumption of data traffic of the cellular network, and reducing consumption costs of a user. In addition, when the traffic of the data stream received by the electronic device 100 in the unit time is greater than the first threshold, the electronic device 100 first receives a data stream created earlier, so that a play start delay can be reduced to some extent, and a user waiting time is reduced.

The following describes in detail the data transmission method provided in this embodiment of this application with reference to accompanying drawings and application scenarios mainly by using an example in which the electronic device 100 plays streaming media that comes from the first application server.

It is assumed that data is transmitted between the electronic device 100 and the first application server by using a Wi-Fi network resource and an LTE network resource. In this embodiment of this application, the electronic device 100 monitors a traffic change of a received data stream that corresponds to streaming media.

Scenario 1: When detecting a first operation performed by a user on a play control (for example, a video play control) of a video service in a Huawei video application, the electronic device 100 receives, in a unit time, a data stream that corresponds to the video service and that is sent by the first application server. Usually, in this case, traffic of the data stream is very large. To be specific, in this case, the traffic of the data stream received by the electronic device 100 in the unit time is greater than the first threshold.

Therefore, in a possible implementation, the electronic device 100 may receive the data stream of the service by using both the TCP connection corresponding to the Wi-Fi network and the TCP connection corresponding to the LTE network in parallel. Specifically, when the traffic of the received data stream in the unit time is greater than the first threshold, the electronic device 100 may first obtain a creation time of each data stream from the first application server, and determine a receiving sequence of each data stream based on a sequence of the creation time of the data stream (for example, a creation time of a socket (Socket)). The electronic device 100 preferentially receives N data streams ranked top by using both the TCP connection corresponding to the Wi-Fi network and the TCP connection corresponding to the LTE network. In this way, it can be ensured that a data stream created earlier by the first application server is received at a comparatively high rate, so that a first screen is quickly played, a play start delay is reduced, and user experience is improved.

Scenario 2: In a process of playing the video service, the electronic device 100 receives a data stream, sent by the first application server, of a cached time period of the video service, and stores the received data stream of the cached time period in a buffer. After traffic of the data stream, stored in the buffer of the electronic device 100, of the cached time period reaches an upper limit, traffic of a data stream of the video service that is received by the electronic device 100 from the first application server instantly decreases. To be specific, in this case, traffic of a data stream received by the electronic device 100 in a unit time is less than the second threshold. Therefore, the electronic device 100 performs an adjustment and receives, preferentially by using the TCP connection corresponding to Wi-Fi, a data stream of the video service that is sent by the first application server in a subsequent time period, until traffic of a data stream in a unit time is suddenly greater than the first threshold. It should be noted that specific values of the second threshold and the first threshold may be set according to an actual requirement. In addition, the first threshold is far greater than the second threshold.

Scenario 3: If the electronic device 100 detects a second operation performed by a user on a play exit control (for example, a video play exit control) of a video service in a Huawei video application, although the electronic device 100 no longer receives a data stream of the video service, the electronic device 100 receives, in a unit time, a data stream of another service on a video main menu interface. In this case, traffic of a data stream received by the electronic device 100 in a unit time suddenly becomes very large. Therefore, in this case, the electronic device 100 receives the data stream of the another service by using both the TCP connection corresponding to the Wi-Fi network and the TCP connection corresponding to the LTE network in parallel.

It should be noted that, in this embodiment of this application, the first operation and the second operation include a voice operation or a gesture operation. The gesture operation may include a touch gesture or a hover gesture. The touch gesture may include but is not limited to tap, double-tap, touch and hold, press, drag, and the like. In addition, the foregoing data transmission method is not only applicable to a streaming media service, but also applicable to a service with another type identifier, for example, a payment service corresponding to an Alipay application or an order service of a Taobao application.

To sum up, according to the foregoing data transmission method in this embodiment of this application, the data stream receiving policy may be adjusted in a timely manner based on the type identifier of the received data stream or a traffic change status of the data stream, so that the data stream can be received from the first application server efficiently, and data traffic of a wide area network can be used as little as possible, thereby reducing consumption costs of a user.

An embodiment of this application further provides a computer readable storage medium. The computer readable storage medium includes a computer program. When the computer program runs on an electronic device, the electronic device is enabled to perform any possible implementation of the foregoing data transmission method.

An embodiment of this application further provides a computer program product. When the computer program product runs on an electronic device, the electronic device is enabled to perform any possible implementation of the foregoing data transmission method.

Figure 12:
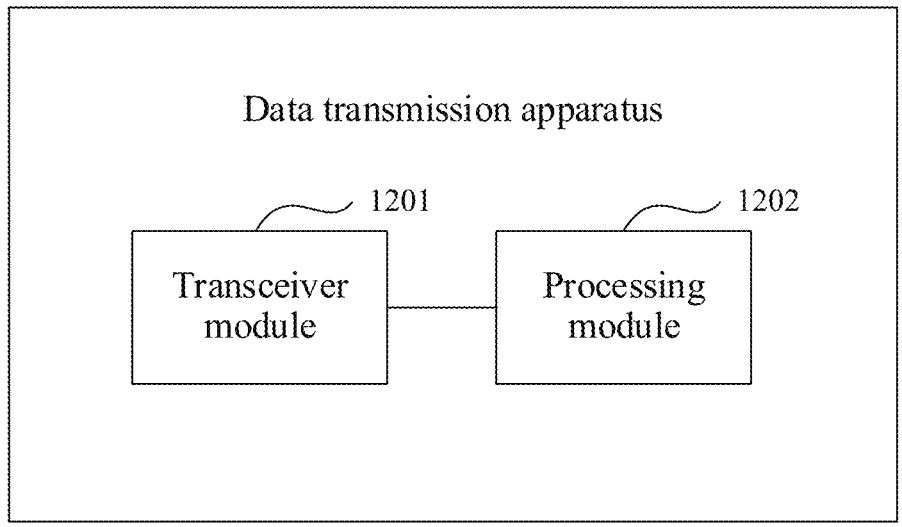
FIG. 12 is a schematic structural diagram of a data transmission apparatus according to an embodiment of this application.

In some embodiments of this application, an embodiment of this application discloses a data transmission apparatus. As shown in FIG. 12, the data transmission apparatus is configured to implement the methods described in the foregoing method embodiments, and includes a transceiver module 1201 and a processing module 1202. The transceiver module 1201 is configured to support an electronic device in receiving indication information and a data stream from a first application server. The processing module 1202 is configured to support the electronic device in adjusting a receiving policy of each TCP connection, for example, as shown in operation 202 to operation 213a in FIG. 9A and FIG. 9B, operation 202 to operation 213b in FIG. 10A and FIG. 10B, or operation 302 to operation 306 in FIG. 11. For function descriptions of the corresponding functional modules, refer to all related content of the operations included in the foregoing method embodiments. Details are not described herein again.

Figure 13:
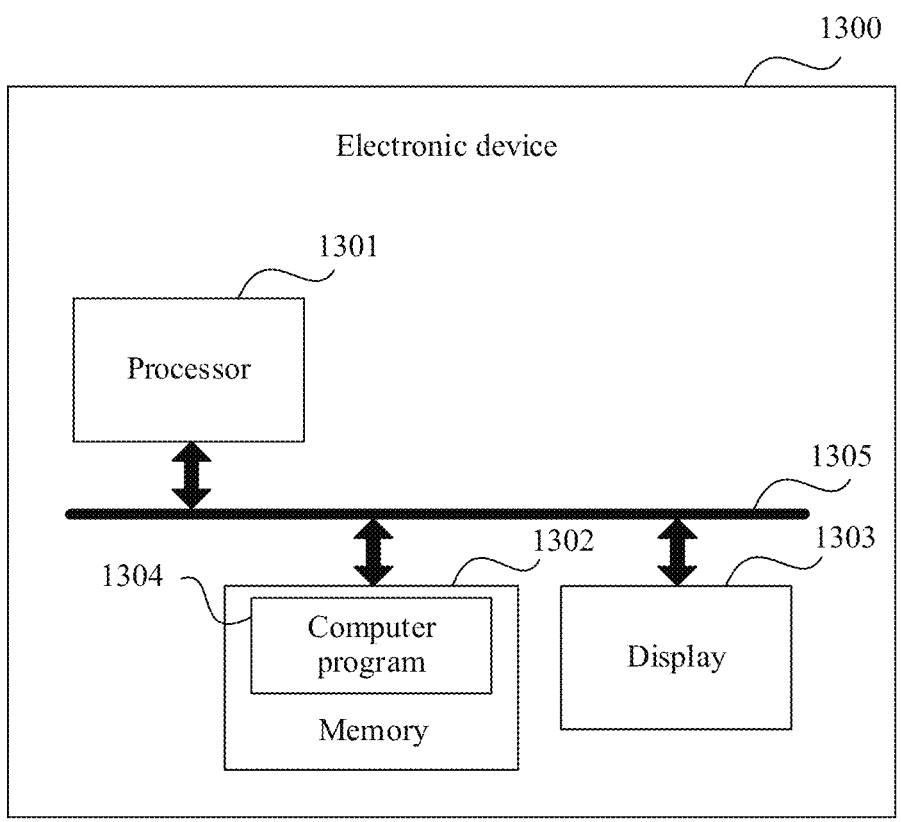
FIG. 13 is a schematic structural diagram of an electronic device according to an embodiment of this application.

In some other embodiments of this application, an embodiment of this application discloses an electronic device. As shown in FIG. 13, the electronic device may include one or more processors 1301, a memory 1302, a display 1303, one or more application programs (not shown), and one or more computer programs 1304. The foregoing devices may be connected by using one or more communications buses 1305. The one or more computer programs 1304 are stored in the memory 1302 and are configured to be executed by the one or more processors 1301. The one or more computer programs 1304 include an instruction. The instruction may be used to perform the operations in FIG. 9A and FIG. 9B, FIG. 11, and corresponding embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of the embodiments of this application shall be subject to the protection scope of the claims.

What is claimed is:

1. A data transmission method, comprising:
    establishing, by an electronic device, a multipath transmission control protocol (MPTCP) connection to a first application server, wherein the MPTCP connection comprises a first TCP connection and a second TCP connection, and a data transmission delay of the first TCP connection is less than a data transmission delay of the second TCP connection;
    receiving, by the electronic device, indication information from the first application server, wherein the indication information comprises a type identifier that indicates a type of a data stream of a first service sent by the first application server;
    determining whether the type identifier is a first identifier or a second identifier;
    based on the determination, receiving, by the electronic device, the data stream from the first application server using the first TCP connection in a first time period or using the second TCP connection in a second time period after the electronic device receives the indication information,
    wherein
    a delay for a data stream indicated by the first identifier is less than a delay for a data stream indicated by the second identifier.

2. The method according to claim 1, the method further comprises:
    obtaining, by the electronic device, a parameter from the indication information, the parameter indicating a bandwidth requirement; and
    when the type identifier is the second identifier, and a bandwidth corresponding to a maximum receive window of the second TCP connection is less than the bandwidth requirement indicated by the parameter, receiving, by the electronic device, the data stream in the second time period also using the first TCP connection.

3. The method according to claim 2, wherein the method further comprises:
    adjusting, by the electronic device, a receive window of the first TCP connection in the second time period, so that an aggregated bandwidth of the second TCP connection or the first TCP connection is greater than or equal to the bandwidth requirement indicated by the parameter.

4. The method according to claim 1, wherein the first TCP connection is a TCP connection corresponding to a cellular network, and the second TCP connection is a TCP connection corresponding to a wireless fidelity Wi-Fi network.

5. A data transmission method, comprising:
    establishing, by an electronic device, a multipath transmission control protocol (MPTCP) connection to a first application server, wherein the MPTCP connection comprises a first TCP connection and a second TCP connection, and a data transmission delay of the first TCP connection is less than a data transmission delay of the second TCP connection; and
    receiving, by the electronic device, a data stream from the first application server;
    when the electronic device determines that a traffic of the data stream received in a unit time is greater than a first threshold, obtaining, by the electronic device, a creation time of each data stream from the first application server;
    simultaneously receiving, by the electronic device based on the creation time of the data stream using both the first TCP connection and the second TCP connection, N data streams whose creation time is later than a specified threshold, wherein N is a positive integer greater than or equal to 1; and
    when the electronic device determines that traffic of the data stream received in the unit time is less than a second threshold, receiving, by the electronic device, the data stream using the second TCP connection, wherein the first threshold is greater than the second threshold.

6. The method according to claim 5, wherein the first TCP connection is a TCP connection corresponding to a cellular network, and the second TCP connection is a TCP connection corresponding to a wireless fidelity Wi-Fi network.

7. An electronic device, comprising a processor and a memory, wherein
    the memory is configured to store one or more computer programs,
    which, when executed by the processor, cause the electronic device to perform the operations comprising:
    establishing a multipath transmission control protocol (MPTCP) connection to a first application server, wherein the MPTCP connection comprises a first TCP connection and a second TCP connection, and a data transmission delay of the first TCP connection is less than a data transmission delay of the second TCP connection;
    receiving indication information from the first application server, wherein the indication information comprises a type identifier that indicates a type of a data stream sent by the first application server;
    determining whether the type identifier is a first identifier or a second identifier;
    based on the determination, receiving, by the electronic device, the data stream from the first application server using the first TCP connection in a first time period or using the second TCP connection in a second time period after the electronic device receives the indication information,
wherein
a delay for a data stream indicated by the first identifier is less than a delay for a data stream indicated by the second identifier.

8. The electronic device according to claim 7, the operations further comprising:
when the indication information comprises a parameter that indicates a bandwidth requirement, the identifier is the second identifier, and a bandwidth corresponding to a maximum receive window of the second TCP connection is less than the bandwidth requirement indicated by the parameter, receiving the data stream in the second time period also by using the first TCP connection.

9. The electronic device according to claim 8, the operation further comprising:
adjusting, by the electronic device, a receive window of the first TCP connection in the second time period, so that an aggregated bandwidth of the second TCP connection or the first TCP connection is greater than or equal to the bandwidth requirement indicated by the parameter.

10. The electronic device according to claim 7, wherein the first TCP connection is a TCP connection corresponding to a cellular network, and the second TCP connection is a TCP connection corresponding to a wireless fidelity Wi-Fi network.

11. An electronic device, comprising a processor and a memory, wherein
the memory is configured to store one or more computer programs,
which, when executed by the processor, causes the electronic device to perform the operations comprising:
establishing a multipath transmission control protocol (MPTCP) connection to a first application server, wherein the MPTCP connection comprises a first TCP connection and a second TCP connection, and a data transmission delay of the first TCP connection is less than a data transmission delay of the second TCP connection;
receiving, by the electronic device, a data stream from the first application server;
when the electronic device determines that a traffic of the data stream received in a unit time is greater than a first threshold, obtaining, by the electronic device, a creation time of each data stream from the first application server;
simultaneously receiving, by the electronic device based on the creation time of the data stream using both the first TCP connection and the second TCP connection, N data streams whose creation time is greater than a specified threshold, wherein N is a positive integer greater than or equal to 1; and
when the electronic device determines that traffic of the data stream received in the unit time is less than a second threshold, receiving, by the electronic device, the data stream preferentially by using the second TCP connection, wherein the first threshold is greater than the second threshold.

12. The electronic device according to claim 11, wherein the first TCP connection is a TCP connection corresponding to a cellular network, and the second TCP connection is a TCP connection corresponding to a wireless fidelity Wi-Fi network.

13. A non-transitory computer-readable storage medium, wherein the computer-readable storage medium comprises a computer program, which, when running on an electronic device, causes the electronic device to perform the method according to claim 1.

14. A non-transitory computer-readable storage medium, wherein the computer-readable storage medium comprises a computer program, which, when running on an electronic device, causes the electronic device to perform the operations comprising: establishing, by an electronic device, a multipath transmission control protocol (MPTCP) connection to a first application server, wherein the MPTCP connection comprises a first TCP connection and a second TCP connection, and a data transmission delay of the first TCP connection is less than a data transmission delay of the second TCP connection;
receiving, by the electronic device, indication information from the first application server, wherein the indication information comprises a type identifier that indicates a type of a data stream of a first service sent by the first application server;
determining whether the type identifier is a first identifier or a second identifier;
based on the determination, receiving, by the electronic device, the data stream from the first application server using the first TCP connection in a first time period or using the second TCP connection in a second time period after the electronic device receives the indication information, wherein a delay for a data stream indicated by the first identifier is less than a delay for a data stream indicated by the second identifier.

* * * * *